(12) United States Patent
Cotterill

(10) Patent No.: US 10,142,835 B2
(45) Date of Patent: Nov. 27, 2018

(54) AUTHENTICATION WITH SECONDARY APPROVER

(71) Applicant: Apple Inc., Cupertino, CA (US)

(72) Inventor: Stephen Hayden Cotterill, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/134,638

(22) Filed: Apr. 21, 2016

(65) Prior Publication Data

US 2016/0345172 A1  Nov. 24, 2016

Related U.S. Application Data

(63) Continuation of application No. 14/642,366, filed on Mar. 9, 2015, now Pat. No. 9,342,681, which is a
(Continued)

(51) Int. Cl.

| | |
|---|---|
| *G06F 21/35* | (2013.01) |
| *H04W 12/06* | (2009.01) |
| *G06F 21/36* | (2013.01) |
| *G06F 21/40* | (2013.01) |
| *G06Q 10/10* | (2012.01) |
| *H04L 29/06* | (2006.01) |

(52) U.S. Cl.
CPC ............ *H04W 12/06* (2013.01); *G06F 21/35* (2013.01); *G06F 21/36* (2013.01); *G06F 21/40* (2013.01); *G06Q 10/10* (2013.01); *H04L 63/083* (2013.01)

(58) Field of Classification Search
CPC ........... G06F 21/35; G06F 21/40; G06F 21/36
USPC .................. 455/406, 410, 411, 415; 726/14
See application file for complete search history.

(56) References Cited

U.S. PATENT DOCUMENTS

| | | |
|---|---|---|
| 4,353,056 A | 10/1982 | Tsikos |
| 5,325,442 A | 6/1994 | Knapp |
| | (Continued) | |

FOREIGN PATENT DOCUMENTS

| | | |
|---|---|---|
| AU | 2015100708 A4 | 7/2015 |
| AU | 2015100709 A4 | 7/2015 |
| | (Continued) | |

OTHER PUBLICATIONS

PCT International Search Report and Written Opinion of the International Searching Authority for International Application No. PCT/US2012/057656, dated Feb. 25, 2013, (9 pages).
(Continued)

*Primary Examiner* — Sam Bhattacharya
(74) *Attorney, Agent, or Firm* — Dentons US LLP

(57) ABSTRACT

Techniques are provided for giving access to restricted content on a first device from a second device through a wireless network. In one embodiment, the first device transmits an authorization request signal to the second device or to a server in the wireless network. The second device, having received the authorization request, prompts an authorized user to give authorization to the first device by inputting an authentication key such as a password car gesture on the second device. Upon verification of the authentication key, an authorization signal may be wirelessly transmitted to the first device, permitting access to the restricted content or functions on the first device. In some embodiments, the second device may be alerted to an authorization request and may elect a request for authorization from a selectable queue of requests.

28 Claims, 8 Drawing Sheets

Related U.S. Application Data continuation of application No. 13/248,872, filed on Sep. 29, 2011, now Pat. No. 9,002,322.

(56) References Cited

U.S. PATENT DOCUMENTS

| | | | |
|---|---|---|---|
| 5,420,936 A | 5/1995 | Fitzpatrick et al. |
| 5,615,384 A | 3/1997 | Allard et al. |
| 5,799,098 A | 8/1998 | Ort et al. |
| 5,828,773 A | 10/1998 | Setlak et al. |
| 5,838,306 A | 11/1998 | O'Connor et al. |
| 5,852,670 A | 12/1998 | Setlak et al. |
| 5,857,028 A | 1/1999 | Frieling |
| 5,933,134 A | 8/1999 | Shieh |
| 5,943,043 A | 8/1999 | Furuhata et al. |
| 5,952,998 A | 9/1999 | Clancy et al. |
| 5,963,679 A | 10/1999 | Setlak |
| 5,974,150 A | 10/1999 | Kaish et al. |
| 6,028,950 A | 2/2000 | Merjanian |
| 6,037,882 A | 3/2000 | Levy |
| 6,141,436 A | 10/2000 | Srey et al. |
| 6,151,208 A | 11/2000 | Bartlett |
| 6,151,593 A | 11/2000 | Cho et al. |
| 6,181,328 B1 | 1/2001 | Shieh et al. |
| 6,193,153 B1 | 2/2001 | Lambert |
| 6,219,793 B1 | 4/2001 | Li et al. |
| 6,256,022 B1 | 7/2001 | Manaresi et al. |
| 6,282,304 B1 | 8/2001 | Novikov et al. |
| 6,289,114 B1 | 9/2001 | Mainguet |
| 6,292,173 B1 | 9/2001 | Rambaldi et al. |
| 6,317,835 B1 | 11/2001 | Bilger et al. |
| 6,327,376 B1 | 12/2001 | Harkin |
| 6,337,919 B1 | 1/2002 | Dunton |
| 6,393,462 B1 | 5/2002 | Mullen-Schultz |
| 6,398,646 B1 | 6/2002 | Wei et al. |
| 6,421,453 B1 | 7/2002 | Kanevsky et al. |
| 6,484,260 B1 | 11/2002 | Scott et al. |
| 6,487,662 B1 | 11/2002 | Kharon et al. |
| 6,498,861 B1 | 12/2002 | Hamid et al. |
| 6,515,988 B1 | 2/2003 | Eldridge et al. |
| 6,560,612 B1 | 5/2003 | Yamada et al. |
| 6,573,883 B1 | 6/2003 | Bartlett |
| 6,603,462 B2 | 8/2003 | Matusis |
| 6,618,806 B1 | 9/2003 | Brown et al. |
| 6,639,584 B1 | 10/2003 | Li |
| 6,709,333 B1 | 3/2004 | Bradford et al. |
| 6,720,860 B1 | 4/2004 | Narayanaswami |
| 6,795,569 B1 | 9/2004 | Setlak |
| 6,879,710 B1 | 4/2005 | Hinoue et al. |
| 6,941,001 B1 | 9/2005 | Bolle et al. |
| 6,980,081 B2 | 12/2005 | Anderson |
| 7,030,860 B1 | 4/2006 | Hsu et al. |
| 7,039,221 B1 | 5/2006 | Tumey et al. |
| 7,057,607 B2 | 6/2006 | Mayoraz et al. |
| 7,124,300 B1 | 10/2006 | Lemke |
| 7,190,816 B2 | 3/2007 | Mitsuyu et al. |
| 7,239,728 B1 | 7/2007 | Choi et al. |
| 7,346,778 B1 | 3/2008 | Guiter et al. |
| 7,346,779 B2 | 3/2008 | Leeper |
| 7,414,613 B2 | 8/2008 | Simelius |
| 7,415,720 B2 | 8/2008 | Jung |
| 7,420,546 B2 | 9/2008 | Abdallah et al. |
| 7,454,192 B1 | 11/2008 | Zhu |
| 7,496,527 B2 | 2/2009 | Silverstein et al. |
| 7,525,537 B2 | 4/2009 | Abdallah et al. |
| 7,526,728 B2 | 4/2009 | Apparao et al. |
| 7,546,470 B2 | 6/2009 | Schultz |
| 7,630,522 B2 | 12/2009 | Popp et al. |
| 7,633,076 B2 | 12/2009 | Huppi et al. |
| 7,644,019 B2 | 1/2010 | Woda et al. |
| 7,676,748 B1 | 3/2010 | Barrus et al. |
| 7,688,314 B2 | 3/2010 | Abdallah et al. |
| 7,697,729 B2 | 4/2010 | Howell et al. |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,860,536 B2 | 12/2010 | Jobs et al. |
| RE42,038 E | 1/2011 | Abdallah et al. |
| 7,877,455 B2 | 1/2011 | Lamparello et al. |
| 7,921,297 B2 | 4/2011 | Ortiz et al. |
| RE42,574 E | 7/2011 | Cockayne |
| 8,006,299 B2 | 8/2011 | Suominen |
| 8,018,440 B2 | 9/2011 | Townsend et al. |
| 8,042,157 B2 | 10/2011 | Bennett et al. |
| 8,050,997 B1 | 11/2011 | Nosek et al. |
| 8,060,571 B2 | 11/2011 | Rao |
| 8,077,157 B2 | 12/2011 | Sengupta et al. |
| 8,095,634 B2 | 1/2012 | Rao |
| 8,112,787 B2 | 2/2012 | Buer |
| 8,145,912 B2 | 3/2012 | McLean |
| 8,171,137 B1 | 5/2012 | Parks et al. |
| 8,195,507 B2 | 6/2012 | Postrel |
| 8,195,576 B1 | 6/2012 | Grigg et al. |
| 8,224,894 B1 | 7/2012 | Parks et al. |
| 8,225,191 B1 | 7/2012 | Kalman |
| 8,260,879 B2 | 9/2012 | Chan |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,386,563 B2 | 2/2013 | Parks et al. |
| 8,392,259 B2 | 3/2013 | MacGillivray et al. |
| 8,392,617 B1 | 3/2013 | Weber et al. |
| 8,395,658 B2 | 3/2013 | Corson |
| 8,438,400 B2 | 5/2013 | Hoghaug et al. |
| 8,478,363 B2 | 7/2013 | Levien et al. |
| 8,478,816 B2 | 7/2013 | Parks et al. |
| 8,571,937 B2 | 10/2013 | Rose et al. |
| 8,613,070 B1 | 12/2013 | Borzycki et al. |
| 8,638,385 B2 | 1/2014 | Bhogal |
| 8,718,556 B2 | 5/2014 | Lee et al. |
| 8,763,896 B2 | 7/2014 | Kushevsky et al. |
| 8,769,624 B2 | 7/2014 | Cotterill |
| 8,782,775 B2 | 7/2014 | Fadell et al. |
| 8,788,838 B1 | 7/2014 | Fadell et al. |
| 8,812,601 B2 | 8/2014 | Hsieh et al. |
| 8,831,677 B2 | 9/2014 | Villa-Real |
| 8,880,055 B1 | 11/2014 | Clement et al. |
| 8,886,710 B2 | 11/2014 | Evans et al. |
| 8,892,474 B1 | 11/2014 | Inskeep et al. |
| 8,914,840 B2 | 12/2014 | Reisman |
| 8,924,259 B2 | 12/2014 | Neighman et al. |
| 8,942,420 B2 | 1/2015 | Kim et al. |
| 8,943,580 B2 | 1/2015 | Fadell et al. |
| 9,002,322 B2 | 4/2015 | Cotterill |
| 9,038,167 B2 | 5/2015 | Fadell et al. |
| 9,095,779 B2 | 8/2015 | Chan et al. |
| 9,128,601 B2 | 9/2015 | Fadell et al. |
| 9,134,896 B2 | 9/2015 | Fadell et al. |
| 9,179,298 B2 | 11/2015 | Jung et al. |
| 9,250,795 B2 | 2/2016 | Fadell et al. |
| 9,269,083 B1 | 2/2016 | Jarajapu |
| 9,274,647 B2 | 3/2016 | Fadell et al. |
| 9,304,624 B2 | 4/2016 | Fadell et al. |
| 9,305,310 B2 | 4/2016 | Radhakrishnan et al. |
| 9,324,067 B2 | 4/2016 | Van Os et al. |
| 9,329,771 B2 | 5/2016 | Fadell et al. |
| 9,342,674 B2 | 5/2016 | Abdallah et al. |
| 9,355,393 B2 | 5/2016 | Purves et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,600,709 B2 | 3/2017 | Russo |
| 9,680,927 B2 | 6/2017 | Knight et al. |
| 9,842,330 B1 | 12/2017 | Van Os et al. |
| 9,967,401 B2 | 5/2018 | Coffman et al. |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047488 A1 | 11/2001 | Verplaetse et al. |
| 2002/0059295 A1 | 5/2002 | Ludtke et al. |
| 2002/0095588 A1 | 7/2002 | Shigematsu et al. |

(56) References Cited

U.S. PATENT DOCUMENTS

| | | |
|---|---|---|
| 2002/0097145 A1 | 7/2002 | Tumey et al. |
| 2002/0141586 A1 | 10/2002 | Margalit et al. |
| 2002/0169673 A1 | 11/2002 | Prorock et al. |
| 2002/0170782 A1 | 11/2002 | Millikan |
| 2002/0190960 A1 | 12/2002 | Kuo et al. |
| 2002/0191029 A1 | 12/2002 | Gillespie et al. |
| 2002/0191817 A1 | 12/2002 | Sato et al. |
| 2003/0028639 A1 | 2/2003 | Yamamoto et al. |
| 2003/0046557 A1 | 3/2003 | Miller et al. |
| 2003/0048173 A1 | 3/2003 | Shigematsu et al. |
| 2003/0055977 A1 | 3/2003 | Miller |
| 2003/0079057 A1 | 4/2003 | Ruskin et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0142227 A1 | 7/2003 | Van Zee |
| 2003/0163710 A1 | 8/2003 | Ortiz et al. |
| 2003/0181201 A1 | 9/2003 | Bomze et al. |
| 2003/0188183 A1 | 10/2003 | Lee et al. |
| 2003/0195935 A1 | 10/2003 | Leeper |
| 2003/0200184 A1 | 10/2003 | Dominguez et al. |
| 2003/0210127 A1 | 11/2003 | Anderson |
| 2003/0229900 A1 | 12/2003 | Reisman |
| 2004/0030934 A1 | 2/2004 | Mizoguchi et al. |
| 2004/0073432 A1 | 4/2004 | Stone |
| 2004/0076310 A1 | 4/2004 | Hersch et al. |
| 2004/0085300 A1 | 5/2004 | Matusis |
| 2004/0085351 A1 | 5/2004 | Tokkonen |
| 2004/0088564 A1 | 5/2004 | Norman |
| 2004/0104268 A1 | 6/2004 | Bailey |
| 2004/0113819 A1 | 6/2004 | Gauthey et al. |
| 2004/0131237 A1 | 7/2004 | Machida |
| 2004/0135801 A1 | 7/2004 | Thompson et al. |
| 2004/0169722 A1 | 9/2004 | Pena |
| 2004/0172562 A1 | 9/2004 | Berger et al. |
| 2004/0181695 A1 | 9/2004 | Walker |
| 2004/0196400 A1 | 10/2004 | Stavely et al. |
| 2004/0229560 A1 | 11/2004 | Maloney |
| 2004/0230843 A1 | 11/2004 | Jansen |
| 2004/0239648 A1 | 12/2004 | Abdallah et al. |
| 2004/0242200 A1 | 12/2004 | Maeoka et al. |
| 2004/0250138 A1 | 12/2004 | Schneider |
| 2004/0254891 A1 | 12/2004 | Blinn et al. |
| 2004/0260955 A1 | 12/2004 | Mantyla |
| 2005/0024341 A1 | 2/2005 | Gillespie et al. |
| 2005/0040962 A1 | 2/2005 | Funkhouser et al. |
| 2005/0041841 A1 | 2/2005 | Yoo et al. |
| 2005/0060554 A1 | 3/2005 | O'donoghue |
| 2005/0071188 A1 | 3/2005 | Thuerk |
| 2005/0071635 A1 | 3/2005 | Furuyama |
| 2005/0144452 A1 | 3/2005 | Lynch et al. |
| 2005/0078855 A1 | 4/2005 | Chandler et al. |
| 2005/0079896 A1 | 4/2005 | Kokko et al. |
| 2005/0093834 A1 | 5/2005 | Abdallah et al. |
| 2005/0093868 A1 | 5/2005 | Hinckley |
| 2005/0097171 A1 | 5/2005 | Hikichi |
| 2005/0097608 A1 | 5/2005 | Penke et al. |
| 2005/0100198 A1 | 5/2005 | Nakano et al. |
| 2005/0111708 A1 | 5/2005 | Chou |
| 2005/0113071 A1 | 5/2005 | Nagata |
| 2005/0114686 A1 | 5/2005 | Ball et al. |
| 2005/0169503 A1 | 8/2005 | Howell et al. |
| 2005/0174325 A1 | 8/2005 | Setlak |
| 2005/0187873 A1 | 8/2005 | Labrou et al. |
| 2005/0193118 A1 | 9/2005 | Le et al. |
| 2005/0206501 A1 | 9/2005 | Farhat |
| 2005/0221798 A1 | 10/2005 | Sengupta et al. |
| 2005/0226472 A1 | 10/2005 | Komura |
| 2005/0253814 A1 | 11/2005 | Ghassabian |
| 2005/0253817 A1 | 11/2005 | Rytivaara et al. |
| 2005/0254086 A1 | 11/2005 | Shouno |
| 2006/0021003 A1 | 1/2006 | Fisher et al. |
| 2006/0032908 A1 | 2/2006 | Sines |
| 2006/0064313 A1 | 3/2006 | Steinbarth et al. |
| 2006/0075250 A1 | 4/2006 | Liao |
| 2006/0078176 A1 | 4/2006 | Abiko et al. |
| 2006/0080525 A1 | 4/2006 | Ritter et al. |
| 2006/0093183 A1 | 5/2006 | Hosoi |
| 2006/0093192 A1 | 5/2006 | Bechtel |
| 2006/0115130 A1 | 6/2006 | Kozlay |
| 2006/0116555 A1 | 6/2006 | Pavlidis et al. |
| 2006/0120707 A1 | 6/2006 | Kusakari et al. |
| 2006/0132456 A1 | 6/2006 | Anson |
| 2006/0136087 A1 | 6/2006 | Higashiura |
| 2006/0136734 A1 | 6/2006 | Telek et al. |
| 2006/0156028 A1 | 7/2006 | Aoyama et al. |
| 2006/0165060 A1 | 7/2006 | Dua |
| 2006/0179404 A1 | 8/2006 | Yolleck et al. |
| 2006/0185005 A1 | 8/2006 | Graves et al. |
| 2006/0206709 A1 | 9/2006 | Labrou et al. |
| 2006/0214910 A1 | 9/2006 | Mizuno et al. |
| 2006/0224645 A1 | 10/2006 | Kadi |
| 2006/0239517 A1 | 10/2006 | Creasey et al. |
| 2006/0274920 A1 | 12/2006 | Tochikubo et al. |
| 2006/0285663 A1 | 12/2006 | Rathus et al. |
| 2006/0288226 A1 | 12/2006 | Kowal |
| 2006/0288234 A1 | 12/2006 | Azar et al. |
| 2006/0294025 A1 | 12/2006 | Mengerink |
| 2007/0008066 A1 | 1/2007 | Fukuda |
| 2007/0013662 A1 | 1/2007 | Fauth |
| 2007/0014439 A1 | 1/2007 | Ando |
| 2007/0016958 A1 | 1/2007 | Bodepudi et al. |
| 2007/0021194 A1 | 1/2007 | Aida |
| 2007/0061126 A1 | 3/2007 | Russo et al. |
| 2007/0061889 A1 | 3/2007 | Sainaney |
| 2007/0067642 A1 | 3/2007 | Singhal |
| 2007/0073649 A1 | 3/2007 | Kikkoji et al. |
| 2007/0089164 A1 | 4/2007 | Gao et al. |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0115933 A1 | 5/2007 | Muhamed et al. |
| 2007/0131759 A1 | 6/2007 | Cox et al. |
| 2007/0150842 A1 | 6/2007 | Chaudhri et al. |
| 2007/0180492 A1 | 8/2007 | Hassan et al. |
| 2007/0186106 A1 | 8/2007 | Ting et al. |
| 2007/0189583 A1 | 8/2007 | Shimada et al. |
| 2007/0194113 A1 | 8/2007 | Esplin et al. |
| 2007/0204037 A1 | 8/2007 | Kunz et al. |
| 2007/0208743 A1 | 9/2007 | Sainaney |
| 2007/0220273 A1 | 9/2007 | Campisi |
| 2007/0226778 A1 | 9/2007 | Pietruszka |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0250573 A1 | 10/2007 | Rothschild |
| 2007/0253604 A1 | 11/2007 | Inoue et al. |
| 2007/0259716 A1 | 11/2007 | Mattice et al. |
| 2007/0260558 A1 | 11/2007 | Look |
| 2007/0277224 A1 | 11/2007 | Osborn et al. |
| 2007/0280515 A1 | 12/2007 | Goto |
| 2007/0283011 A1 | 12/2007 | Rakowski et al. |
| 2008/0001703 A1 | 1/2008 | Goto |
| 2008/0027947 A1 | 1/2008 | Pritchett et al. |
| 2008/0032801 A1 | 2/2008 | Brunet De Courssou |
| 2008/0040786 A1 | 2/2008 | Chang |
| 2008/0041936 A1 | 2/2008 | Vawter |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0052181 A1 | 2/2008 | Devitt-carolan et al. |
| 2008/0069412 A1 | 3/2008 | Champagne et al. |
| 2008/0072045 A1 | 3/2008 | Mizrah |
| 2008/0092245 A1 | 4/2008 | Alward et al. |
| 2008/0114678 A1 | 5/2008 | Bennett et al. |
| 2008/0120707 A1 | 5/2008 | Ramia |
| 2008/0133931 A1 | 6/2008 | Kosaka |
| 2008/0160974 A1 | 7/2008 | Vartiainen et al. |
| 2008/0165255 A1 | 7/2008 | Christie et al. |
| 2008/0172598 A1 | 7/2008 | Jacobsen et al. |

(56) References Cited

U.S. PATENT DOCUMENTS

| | | |
|---|---|---|
| 2008/0178283 A1 | 7/2008 | Pratt et al. |
| 2008/0208762 A1 | 8/2008 | Arthur et al. |
| 2008/0229409 A1 | 9/2008 | Miller et al. |
| 2008/0250481 A1 | 10/2008 | Beck et al. |
| 2008/0282202 A1 | 11/2008 | Sunday |
| 2008/0292074 A1 | 11/2008 | Boni et al. |
| 2008/0292144 A1 | 11/2008 | Kim |
| 2008/0309632 A1 | 12/2008 | Westerman et al. |
| 2008/0313257 A1 | 12/2008 | Allen et al. |
| 2008/0314971 A1 | 12/2008 | Faith et al. |
| 2008/0317292 A1 | 12/2008 | Baker et al. |
| 2009/0005165 A1 | 1/2009 | Arezina et al. |
| 2009/0006292 A1 | 1/2009 | Block |
| 2009/0006991 A1 | 1/2009 | Lindberg et al. |
| 2009/0031375 A1 | 1/2009 | Sullivan et al. |
| 2009/0036165 A1 | 2/2009 | Brede |
| 2009/0037742 A1 | 2/2009 | Narayanaswami |
| 2009/0054044 A1 | 2/2009 | Ikemori et al. |
| 2009/0061837 A1 | 3/2009 | Chaudhri et al. |
| 2009/0063851 A1 | 3/2009 | Nijdam |
| 2009/0064055 A1 | 3/2009 | Chaudhri et al. |
| 2009/0067685 A1 | 3/2009 | Boshra et al. |
| 2009/0067689 A1 | 3/2009 | Porter et al. |
| 2009/0074255 A1 | 3/2009 | Holm |
| 2009/0083850 A1 | 3/2009 | Fadell et al. |
| 2009/0094681 A1 | 4/2009 | Sadler et al. |
| 2009/0100383 A1 | 4/2009 | Sunday et al. |
| 2009/0119754 A1 | 5/2009 | Schubert |
| 2009/0122149 A1 | 5/2009 | Ishii |
| 2009/0135678 A1 | 5/2009 | Godat |
| 2009/0140960 A1 | 6/2009 | Mahowald |
| 2009/0144451 A1 | 6/2009 | Cabezas et al. |
| 2009/0158390 A1 | 6/2009 | Guan |
| 2009/0160609 A1 | 6/2009 | Lin et al. |
| 2009/0164581 A1 | 6/2009 | Bove et al. |
| 2009/0164878 A1 | 6/2009 | Cottrille |
| 2009/0165107 A1 | 6/2009 | Tojo et al. |
| 2009/0173784 A1 | 7/2009 | Yang |
| 2009/0176565 A1 | 7/2009 | Kelly |
| 2009/0187423 A1 | 7/2009 | Kim |
| 2009/0193514 A1 | 7/2009 | Adams et al. |
| 2009/0201257 A1 | 8/2009 | Saitoh et al. |
| 2009/0210308 A1 | 8/2009 | Toomer et al. |
| 2009/0224874 A1 | 9/2009 | Dewar et al. |
| 2009/0228938 A1 | 9/2009 | White et al. |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0258667 A1 | 10/2009 | Suzuki et al. |
| 2009/0271744 A1 | 10/2009 | Anders, Jr. |
| 2009/0307139 A1 | 12/2009 | Mardikar et al. |
| 2009/0327744 A1 | 12/2009 | Hatano |
| 2009/0328162 A1 | 12/2009 | Kokumai et al. |
| 2010/0008545 A1 | 1/2010 | Ueki et al. |
| 2010/0023449 A1 | 1/2010 | Skowronek et al. |
| 2010/0026453 A1 | 2/2010 | Yamamoto et al. |
| 2010/0034432 A1 | 2/2010 | Ono et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0114731 A1 | 5/2010 | Kingston et al. |
| 2010/0146384 A1 | 6/2010 | Peev et al. |
| 2010/0153265 A1 | 6/2010 | Hershfield et al. |
| 2010/0158327 A1 | 6/2010 | Kangas et al. |
| 2010/0159995 A1 | 6/2010 | Stallings et al. |
| 2010/0164684 A1 | 7/2010 | Sasa et al. |
| 2010/0164864 A1 | 7/2010 | Chou |
| 2010/0182125 A1 | 7/2010 | Abdallah et al. |
| 2010/0223145 A1 | 9/2010 | Dragt |
| 2010/0223542 A1 | 9/2010 | Vuong et al. |
| 2010/0237991 A1 | 9/2010 | Prabhu et al. |
| 2010/0265204 A1 | 10/2010 | Tsuda |
| 2010/0267362 A1 | 10/2010 | Smith et al. |
| 2010/0269156 A1 | 10/2010 | Hohlfeld et al. |
| 2010/0272250 A1 | 10/2010 | Yap et al. |
| 2010/0273461 A1 | 10/2010 | Choi |
| 2010/0299436 A1 | 11/2010 | Khalid et al. |
| 2010/0302016 A1 | 12/2010 | Zaborowski |
| 2010/0306107 A1 | 12/2010 | Nahari |
| 2010/0313263 A1 | 12/2010 | Uchida et al. |
| 2011/0013813 A1 | 1/2011 | Yamamoto et al. |
| 2011/0029891 A1 | 2/2011 | Kim et al. |
| 2011/0041102 A1 | 2/2011 | Kim |
| 2011/0054268 A1 | 3/2011 | Fidacaro et al. |
| 2011/0065384 A1 | 3/2011 | Cader et al. |
| 2011/0088086 A1 | 4/2011 | Swink et al. |
| 2011/0099079 A1 | 4/2011 | White |
| 2011/0106671 A1 | 5/2011 | Minnis et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1 | 6/2011 | Rogers |
| 2011/0149874 A1 | 6/2011 | Reif |
| 2011/0175703 A1 | 7/2011 | Benkley, III |
| 2011/0179386 A1 | 7/2011 | Shaffer et al. |
| 2011/0187497 A1 | 8/2011 | Chin |
| 2011/0214158 A1 | 9/2011 | Pasquero et al. |
| 2011/0225057 A1 | 9/2011 | Webb et al. |
| 2011/0251892 A1 | 10/2011 | Laracey |
| 2011/0275358 A1 | 11/2011 | Faenger |
| 2011/0281568 A1 | 11/2011 | Le Clech |
| 2011/0286640 A1 | 11/2011 | Kwon et al. |
| 2011/0300829 A1 | 12/2011 | Nurmi et al. |
| 2011/0314398 A1 | 12/2011 | Yano |
| 2011/0319056 A1 | 12/2011 | Toy et al. |
| 2011/0320450 A1 | 12/2011 | Liu et al. |
| 2012/0009896 A1 | 1/2012 | Bandyopadhyay et al. |
| 2012/0016678 A1 | 1/2012 | Gruber et al. |
| 2012/0024947 A1 | 2/2012 | Naelon |
| 2012/0028609 A1 | 2/2012 | Hruska |
| 2012/0036556 A1 | 2/2012 | Lebeau et al. |
| 2012/0040719 A1 | 2/2012 | Lee et al. |
| 2012/0059813 A1 | 3/2012 | Sejnoha et al. |
| 2012/0072546 A1 | 3/2012 | Etchegoyen |
| 2012/0078751 A1 | 3/2012 | Macphail et al. |
| 2012/0079126 A1 | 3/2012 | Evans et al. |
| 2012/0089507 A1 | 4/2012 | Zhang et al. |
| 2012/0096069 A1 | 4/2012 | Chan |
| 2012/0096076 A1 | 4/2012 | Chan |
| 2012/0096386 A1 | 4/2012 | Baumann et al. |
| 2012/0123937 A1 | 5/2012 | Spodak |
| 2012/0129496 A1 | 5/2012 | Park et al. |
| 2012/0139698 A1 | 6/2012 | Tsui et al. |
| 2012/0143694 A1 | 6/2012 | Zargahi et al. |
| 2012/0185397 A1 | 7/2012 | Levovitz |
| 2012/0197740 A1 | 8/2012 | Grigg et al. |
| 2012/0209748 A1 | 8/2012 | Small |
| 2012/0214458 A1 | 8/2012 | Levien et al. |
| 2012/0221464 A1 | 8/2012 | Pasquero et al. |
| 2012/0223890 A1 | 9/2012 | Borovsky et al. |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0283871 A1 | 11/2012 | Chai et al. |
| 2012/0284185 A1 | 11/2012 | Mettler et al. |
| 2012/0284297 A1 | 11/2012 | Aguera-arcas et al. |
| 2012/0284673 A1 | 11/2012 | Lamb et al. |
| 2012/0290449 A1 | 11/2012 | Mullen et al. |
| 2012/0290472 A1 | 11/2012 | Mullen et al. |
| 2012/0290657 A1 | 11/2012 | Parks et al. |
| 2012/0290943 A1 | 11/2012 | Toney et al. |
| 2012/0291121 A1 | 11/2012 | Huang et al. |
| 2012/0293438 A1 | 11/2012 | Chaudhri et al. |
| 2012/0297017 A1 | 11/2012 | Livshits et al. |
| 2012/0310760 A1 | 12/2012 | Phillips et al. |
| 2012/0311499 A1 | 12/2012 | Dellinger et al. |
| 2012/0322370 A1 | 12/2012 | Lee |
| 2012/0322371 A1 | 12/2012 | Lee |
| 2013/0005487 A1 | 1/2013 | Frazzini et al. |
| 2013/0007203 A1 | 1/2013 | Szu |
| 2013/0031217 A1 | 1/2013 | Rajapakse |
| 2013/0041790 A1 | 2/2013 | Murugesan et al. |
| 2013/0046893 A1 | 2/2013 | Hauser et al. |

(56) References Cited

U.S. PATENT DOCUMENTS

| | | |
|---|---|---|
| 2013/0047233 A1 | 2/2013 | Fisk et al. |
| 2013/0054697 A1 | 2/2013 | Cha |
| 2013/0063364 A1 | 3/2013 | Moore |
| 2013/0067545 A1 | 3/2013 | Hanes |
| 2013/0073286 A1 | 3/2013 | Bastea-forte et al. |
| 2013/0080177 A1 | 3/2013 | Chen |
| 2013/0080272 A1 | 3/2013 | Ronca et al. |
| 2013/0080275 A1 | 3/2013 | Ronca et al. |
| 2013/0080525 A1 | 3/2013 | Aoki et al. |
| 2013/0082819 A1 | 4/2013 | Cotterill |
| 2013/0085931 A1 | 4/2013 | Runyan |
| 2013/0086637 A1 | 4/2013 | Cotterill |
| 2013/0102281 A1 | 4/2013 | Kanda et al. |
| 2013/0103519 A1 | 4/2013 | Kountotsis et al. |
| 2013/0110719 A1 | 5/2013 | Carter et al. |
| 2013/0115932 A1 | 5/2013 | Williams et al. |
| 2013/0120254 A1 | 5/2013 | Mun et al. |
| 2013/0124423 A1 | 5/2013 | Fisher |
| 2013/0129162 A1 | 5/2013 | Cheng et al. |
| 2013/0144706 A1 | 6/2013 | Qawami et al. |
| 2013/0145303 A1 | 6/2013 | Prakash et al. |
| 2013/0145448 A1 | 6/2013 | Newell |
| 2013/0151360 A1 | 6/2013 | Scipioni et al. |
| 2013/0159178 A1 | 6/2013 | Colon et al. |
| 2013/0173699 A1 | 7/2013 | Parks et al. |
| 2013/0174044 A1 | 7/2013 | Hill |
| 2013/0189953 A1 | 7/2013 | Mathews |
| 2013/0189963 A1 | 7/2013 | Epp et al. |
| 2013/0191911 A1 | 7/2013 | Dellinger et al. |
| 2013/0198112 A1 | 8/2013 | Bhat |
| 2013/0200146 A1 | 8/2013 | Moghadam |
| 2013/0212212 A1 | 8/2013 | Addepalli et al. |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0232073 A1 | 9/2013 | Sheets et al. |
| 2013/0239202 A1 | 9/2013 | Adams et al. |
| 2013/0243264 A1 | 9/2013 | Aoki |
| 2013/0244615 A1 | 9/2013 | Miller |
| 2013/0254574 A1 | 9/2013 | Zacchio et al. |
| 2013/0262857 A1 | 10/2013 | Neuman et al. |
| 2013/0275300 A1 | 10/2013 | Killian et al. |
| 2013/0279768 A1 | 10/2013 | Boshra |
| 2013/0283199 A1 | 10/2013 | Selig et al. |
| 2013/0297414 A1 | 11/2013 | Goldfarb et al. |
| 2013/0298024 A1 | 11/2013 | Rhee et al. |
| 2013/0304651 A1 | 11/2013 | Smith |
| 2013/0304758 A1 | 11/2013 | Gruber et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0318158 A1 | 11/2013 | Teng et al. |
| 2013/0318249 A1 | 11/2013 | Mcdonough et al. |
| 2013/0325967 A1 | 12/2013 | Parks et al. |
| 2013/0326563 A1 | 12/2013 | Mulcahy et al. |
| 2013/0332162 A1 | 12/2013 | Keen |
| 2013/0332358 A1 | 12/2013 | Zhao |
| 2013/0332364 A1 | 12/2013 | Templeton et al. |
| 2013/0332560 A1 | 12/2013 | Knight et al. |
| 2013/0336545 A1 | 12/2013 | Pritikin et al. |
| 2013/0346068 A1 | 12/2013 | Solem et al. |
| 2013/0346273 A1 | 12/2013 | Stockton et al. |
| 2014/0003597 A1 | 1/2014 | Lazaridis et al. |
| 2014/0003677 A1 | 1/2014 | Han et al. |
| 2014/0006285 A1 | 1/2014 | Chi et al. |
| 2014/0025513 A1 | 1/2014 | Cooke et al. |
| 2014/0025520 A1 | 1/2014 | Mardikar et al. |
| 2014/0032706 A1 | 1/2014 | Kuscher et al. |
| 2014/0036099 A1 | 2/2014 | Balassanian |
| 2014/0047020 A1 | 2/2014 | Matus et al. |
| 2014/0047382 A1 | 2/2014 | Kim |
| 2014/0052553 A1 | 2/2014 | Uzo |
| 2014/0058860 A1 | 2/2014 | Roh et al. |
| 2014/0058935 A1 | 2/2014 | Mijares |
| 2014/0058941 A1 | 2/2014 | Moon et al. |
| 2014/0064155 A1 | 3/2014 | Evans |
| 2014/0068740 A1 | 3/2014 | Lecun et al. |
| 2014/0068751 A1 | 3/2014 | Last |
| 2014/0074716 A1 | 3/2014 | Ni |
| 2014/0075130 A1 | 3/2014 | Bansal et al. |
| 2014/0082136 A1 | 3/2014 | Garcia puga et al. |
| 2014/0089196 A1 | 3/2014 | Paya et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0112555 A1 | 4/2014 | Fadell et al. |
| 2014/0115695 A1 | 4/2014 | Fadell et al. |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0136481 A1 | 5/2014 | Quan et al. |
| 2014/0136986 A1 | 5/2014 | Martin et al. |
| 2014/0138435 A1 | 5/2014 | Khalid |
| 2014/0140587 A1 | 5/2014 | Ballard et al. |
| 2014/0143145 A1 | 5/2014 | Kortina et al. |
| 2014/0149884 A1 | 5/2014 | Flynn, et al. |
| 2014/0155031 A1 | 6/2014 | Lee et al. |
| 2014/0156531 A1 | 6/2014 | Poon et al. |
| 2014/0165012 A1 | 6/2014 | Shen et al. |
| 2014/0168696 A1 | 6/2014 | Matsuhara et al. |
| 2014/0173447 A1 | 6/2014 | Das |
| 2014/0173450 A1 | 6/2014 | Akula |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0189589 A1 | 7/2014 | Kim et al. |
| 2014/0195815 A1 | 7/2014 | Taveau et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0223490 A1 | 8/2014 | Pan et al. |
| 2014/0236840 A1 | 8/2014 | Islam |
| 2014/0254891 A1 | 9/2014 | Lee et al. |
| 2014/0258292 A1 | 9/2014 | Thramann et al. |
| 2014/0258828 A1 | 9/2014 | Lymer et al. |
| 2014/0279442 A1 | 9/2014 | Luoma et al. |
| 2014/0279497 A1 | 9/2014 | Qaim-maqami et al. |
| 2014/0279556 A1 | 9/2014 | Priebatsch et al. |
| 2014/0282240 A1 | 9/2014 | Flynn, III |
| 2014/0282987 A1 | 9/2014 | Narendra et al. |
| 2014/0292396 A1 | 10/2014 | Bruwer et al. |
| 2014/0298432 A1 | 10/2014 | Brown |
| 2014/0304809 A1 | 10/2014 | Fadell et al. |
| 2014/0311447 A1 | 10/2014 | Surnilla et al. |
| 2014/0325447 A1 | 10/2014 | Jin et al. |
| 2014/0337931 A1 | 11/2014 | Cotterill |
| 2014/0344082 A1 | 11/2014 | Soundararajan |
| 2014/0359140 A1 | 12/2014 | Shankarraman |
| 2014/0359637 A1 | 12/2014 | Yan |
| 2014/0372309 A1 | 12/2014 | Shirey et al. |
| 2014/0375577 A1 | 12/2014 | Yeh et al. |
| 2014/0380187 A1 | 12/2014 | Gardenfors et al. |
| 2014/0380465 A1 | 12/2014 | Fadell et al. |
| 2015/0012417 A1 | 1/2015 | Joao et al. |
| 2015/0012435 A1 | 1/2015 | Ramavarjula et al. |
| 2015/0014141 A1 | 1/2015 | Rao et al. |
| 2015/0043790 A1 | 2/2015 | Ono et al. |
| 2015/0044965 A1 | 2/2015 | Kamon et al. |
| 2015/0046336 A1 | 2/2015 | Cummins |
| 2015/0051846 A1 | 2/2015 | Masuya |
| 2015/0056957 A1 | 2/2015 | Mardikar et al. |
| 2015/0058146 A1 | 2/2015 | Gaddam et al. |
| 2015/0058191 A1 | 2/2015 | Khan et al. |
| 2015/0074615 A1 | 3/2015 | Han et al. |
| 2015/0077362 A1 | 3/2015 | Seo |
| 2015/0089636 A1 | 3/2015 | Martynov et al. |
| 2015/0095174 A1 | 4/2015 | Dua |
| 2015/0095175 A1 | 4/2015 | Dua |
| 2015/0120545 A1 | 4/2015 | Fiore et al. |
| 2015/0124053 A1 | 5/2015 | Tamura et al. |
| 2015/0127539 A1 | 5/2015 | Ye et al. |

(56) References Cited

U.S. PATENT DOCUMENTS

| | | |
|---|---|---|
| 2015/0146945 A1 | 5/2015 | Han et al. |
| 2015/0163188 A1 | 6/2015 | Faaborg et al. |
| 2015/0170146 A1 | 6/2015 | Ji et al. |
| 2015/0178548 A1 | 6/2015 | Abdallah et al. |
| 2015/0178878 A1 | 6/2015 | Huang |
| 2015/0186636 A1 | 7/2015 | Tharappel et al. |
| 2015/0193069 A1 | 7/2015 | Di censo et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0213560 A1 | 7/2015 | Aabye et al. |
| 2015/0215128 A1 | 7/2015 | Pal |
| 2015/0215398 A1 | 7/2015 | Chang et al. |
| 2015/0229750 A1 | 8/2015 | Zhou et al. |
| 2015/0242611 A1 | 8/2015 | Cotterill |
| 2015/0242837 A1 | 8/2015 | Yarbrough et al. |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0302856 A1 | 10/2015 | Kim et al. |
| 2015/0339466 A1 | 11/2015 | Gao et al. |
| 2015/0339652 A1 | 11/2015 | Park et al. |
| 2015/0347010 A1 | 12/2015 | Yang et al. |
| 2015/0348001 A1 | 12/2015 | Van os et al. |
| 2015/0348002 A1 | 12/2015 | Van os et al. |
| 2015/0348014 A1 | 12/2015 | Van Os et al. |
| 2015/0348029 A1 | 12/2015 | Van os et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0365400 A1 | 12/2015 | Cox |
| 2016/0005024 A1 | 1/2016 | Harrell |
| 2016/0005028 A1 | 1/2016 | Mayblum et al. |
| 2016/0012417 A1 | 1/2016 | Mizon |
| 2016/0012465 A1 | 1/2016 | Sharp |
| 2016/0021003 A1 | 1/2016 | Pan |
| 2016/0034887 A1 | 2/2016 | Lee |
| 2016/0048705 A1 | 2/2016 | Yang et al. |
| 2016/0050199 A1 | 2/2016 | Ganesan |
| 2016/0086176 A1 | 3/2016 | Silva pinto et al. |
| 2016/0092665 A1 | 3/2016 | Cowan et al. |
| 2016/0092877 A1 | 3/2016 | Chew |
| 2016/0104228 A1 | 4/2016 | Sundaresan |
| 2016/0132864 A1 | 5/2016 | Barrese et al. |
| 2016/0134488 A1 | 5/2016 | Straub et al. |
| 2016/0148384 A1 | 5/2016 | Bud et al. |
| 2016/0154956 A1 | 6/2016 | Fadell et al. |
| 2016/0180305 A1 | 6/2016 | Dresser et al. |
| 2016/0188860 A1 | 6/2016 | Lee et al. |
| 2016/0224966 A1 | 8/2016 | Van Os et al. |
| 2016/0224973 A1 | 8/2016 | Van Os et al. |
| 2016/0232516 A1 | 8/2016 | Dayan et al. |
| 2016/0241555 A1 | 8/2016 | Vo et al. |
| 2016/0253665 A1 | 9/2016 | Van Os et al. |
| 2016/0259656 A1 | 9/2016 | Sumner et al. |
| 2016/0267779 A1 | 9/2016 | Kuang |
| 2016/0335495 A1 | 11/2016 | Kim et al. |
| 2016/0342832 A1 | 11/2016 | Bud et al. |
| 2016/0364561 A1 | 12/2016 | Lee |
| 2016/0378966 A1 | 12/2016 | Alten |
| 2017/0017834 A1 | 1/2017 | Sabitov et al. |
| 2017/0032375 A1 | 2/2017 | Van Os et al. |
| 2017/0054731 A1 | 2/2017 | Cotterill |
| 2017/0169202 A1 | 6/2017 | Duggan et al. |
| 2017/0169204 A1 | 6/2017 | Fadell et al. |
| 2017/0185760 A1 | 6/2017 | Wilder |
| 2017/0192730 A1 | 7/2017 | Yang et al. |
| 2017/0199997 A1 | 7/2017 | Fadell et al. |
| 2017/0227935 A1 | 8/2017 | Su et al. |
| 2017/0289249 A1 | 10/2017 | Knight et al. |
| 2017/0339151 A1 | 11/2017 | Van Os et al. |
| 2017/0357972 A1 | 12/2017 | Van Os et al. |
| 2017/0357973 A1 | 12/2017 | Van Os et al. |
| 2018/0068313 A1 | 3/2018 | Van Os et al. |
| 2018/0082282 A1 | 3/2018 | Van Os et al. |
| 2018/0109629 A1 | 4/2018 | Van Os et al. |
| 2018/0114010 A1 | 4/2018 | Van Os et al. |
| 2018/0144178 A1 | 5/2018 | Han et al. |
| 2018/0158066 A1 | 6/2018 | Van Os et al. |
| 2018/0173928 A1 | 6/2018 | Han et al. |
| 2018/0173929 A1 | 6/2018 | Han et al. |
| 2018/0173930 A1 | 6/2018 | Han et al. |

FOREIGN PATENT DOCUMENTS

| | | |
|---|---|---|
| CA | 2876587 A1 | 2/2014 |
| CN | 1163669 A | 10/1997 |
| CN | 1183475 A | 6/1998 |
| CN | 1220433 A | 6/1999 |
| CN | 1525723 A | 9/2004 |
| CN | 1685357 A | 10/2005 |
| CN | 1742252 A | 3/2006 |
| CN | 1801708 A | 7/2006 |
| CN | 1836397 A | 9/2006 |
| CN | 101035335 A | 9/2007 |
| CN | 101268470 A | 9/2008 |
| CN | 101409743 A | 4/2009 |
| CN | 102065148 A | 5/2011 |
| CN | 102262506 A | 11/2011 |
| CN | 102707994 A | 10/2012 |
| CN | 102750086 A | 10/2012 |
| CN | 103250138 A | 8/2013 |
| CN | 103582873 A | 2/2014 |
| CN | 104038256 A | 9/2014 |
| DE | 10153591 A1 | 5/2003 |
| EP | 0593386 A2 | 4/1994 |
| EP | 0923018 A2 | 6/1999 |
| EP | 1043698 A2 | 10/2000 |
| EP | 1215575 A2 | 6/2002 |
| EP | 1257111 A1 | 11/2002 |
| EP | 1357458 A2 | 10/2003 |
| EP | 1422589 A1 | 5/2004 |
| EP | 1626330 A1 | 2/2006 |
| EP | 1645989 A2 | 4/2006 |
| EP | 1736908 A2 | 12/2006 |
| EP | 1760584 A1 | 3/2007 |
| EP | 1950678 A1 | 7/2008 |
| EP | 2247087 A1 | 11/2010 |
| EP | 2654275 A1 | 10/2013 |
| EP | 2701107 A1 | 2/2014 |
| EP | 2725473 A1 | 4/2014 |
| EP | 2725537 A1 | 4/2014 |
| EP | 2770708 A1 | 8/2014 |
| EP | 2993619 A1 | 3/2016 |
| EP | 3057024 A1 | 8/2016 |
| GB | 2184576 A | 6/1987 |
| GB | 2312040 A | 10/1997 |
| GB | 2313460 A | 11/1997 |
| GB | 2360618 A | 9/2001 |
| GB | 2466038 A | 6/2010 |
| GB | 2505476 A | 3/2014 |
| JP | 4-158434 A | 6/1992 |
| JP | 6-284182 A | 10/1994 |
| JP | 7-146942 A | 6/1995 |
| JP | 7-234837 A | 9/1995 |
| JP | 9-128208 A | 5/1997 |
| JP | 9-221950 A | 8/1997 |
| JP | 10-11216 A | 1/1998 |
| JP | 10-63424 A | 3/1998 |
| JP | 10-63427 A | 3/1998 |
| JP | 10-69346 A | 3/1998 |
| JP | 11-73530 A | 3/1999 |
| JP | 11-185016 A | 7/1999 |
| JP | H11-272769 A | 10/1999 |
| JP | 2000-90052 A | 3/2000 |
| JP | 2000-200092 A | 7/2000 |
| JP | 2000259477 A | 9/2000 |
| JP | 2000-293253 A | 10/2000 |
| JP | 2000-315118 A | 11/2000 |
| JP | 2000-339097 A | 12/2000 |

(56) References Cited

FOREIGN PATENT DOCUMENTS

| | | |
|---|---|---|
| JP | 2001-14051 A | 1/2001 |
| JP | 2001-092554 A | 4/2001 |
| JP | 2001-510579 A | 7/2001 |
| JP | 2002-99854 A | 4/2002 |
| JP | 2002-149171 A | 5/2002 |
| JP | 2002-159052 A | 5/2002 |
| JP | 2002-515145 A | 5/2002 |
| JP | 2002-207525 A | 7/2002 |
| JP | 2002-525718 A | 8/2002 |
| JP | 2002-288137 A | 10/2002 |
| JP | 2002-352234 A | 12/2002 |
| JP | 2002-358162 A | 12/2002 |
| JP | 2003-16398 A | 1/2003 |
| JP | 2003-67343 A | 3/2003 |
| JP | 2003-143290 A | 5/2003 |
| JP | 2003-298689 A | 10/2003 |
| JP | 2003-346059 A | 12/2003 |
| JP | 2004-86866 A | 3/2004 |
| JP | 2004-104813 A | 4/2004 |
| JP | 2004-252736 A | 9/2004 |
| JP | 2004-532477 A | 10/2004 |
| JP | 2004-313459 A | 11/2004 |
| JP | 2004-334788 A | 11/2004 |
| JP | 2004-348600 A | 12/2004 |
| JP | 2004-348601 A | 12/2004 |
| JP | 2004-356816 A | 12/2004 |
| JP | 2004356816 A | 12/2004 |
| JP | 2005-4490 A | 1/2005 |
| JP | 2005-71225 A | 3/2005 |
| JP | 2005-122700 A | 5/2005 |
| JP | 2005-521961 A | 7/2005 |
| JP | 2005-523505 A | 8/2005 |
| JP | 2006-12080 A | 1/2006 |
| JP | 2006-85559 A | 3/2006 |
| JP | 2006-114018 A | 4/2006 |
| JP | 2006-115043 A | 4/2006 |
| JP | 2006-163960 A | 6/2006 |
| JP | 2006-172180 A | 6/2006 |
| JP | 2006-189999 A | 7/2006 |
| JP | 2006-197071 A | 7/2006 |
| JP | 2006-202278 A | 8/2006 |
| JP | 2006-215705 A | 8/2006 |
| JP | 2006-277670 A | 10/2006 |
| JP | 2007-34637 A | 2/2007 |
| JP | 2007-41976 A | 2/2007 |
| JP | 2007-71008 A | 3/2007 |
| JP | 2007-128201 A | 5/2007 |
| JP | 2007-148801 A | 6/2007 |
| JP | 2007-219665 A | 8/2007 |
| JP | 2007-334637 A | 12/2007 |
| JP | 2008-250601 A | 10/2008 |
| JP | 2009-15543 A | 1/2009 |
| JP | 2009-49878 A | 3/2009 |
| JP | 2009-99076 A | 5/2009 |
| JP | 2009-296577 A | 12/2009 |
| JP | 2010-9513 A | 1/2010 |
| JP | 2010-503082 A | 1/2010 |
| JP | 201086281 A | 4/2010 |
| JP | 2010-245940 A | 10/2010 |
| JP | 2010-271762 A | 12/2010 |
| JP | 2011-54120 A | 3/2011 |
| JP | 2011-519439 A | 7/2011 |
| JP | 2011-237857 A | 11/2011 |
| JP | 2012-8951 A | 1/2012 |
| JP | 2012-504273 A | 2/2012 |
| JP | 2012-508930 A | 4/2012 |
| JP | 2012-168966 A | 9/2012 |
| JP | 2012-194661 A | 10/2012 |
| JP | 2013-20496 A | 1/2013 |
| JP | 2013-30052 A | 2/2013 |
| JP | 2013-34322 A | 2/2013 |
| JP | 2013-175188 A | 9/2013 |
| JP | 2013-222410 A | 10/2013 |
| JP | 2014-503861 A | 2/2014 |
| JP | 2014-44719 A | 3/2014 |
| JP | 2014-44724 A | 3/2014 |
| JP | 2014-191653 A | 10/2014 |
| JP | 2015-520456 A | 7/2015 |
| KR | 10-2002-0022295 A | 3/2002 |
| KR | 10-2002-0087665 A | 11/2002 |
| KR | 10-2004-0049502 A | 6/2004 |
| KR | 10-2005-0061975 A | 6/2005 |
| KR | 10-0652624 B1 | 12/2006 |
| KR | 10-2007-0026808 A | 3/2007 |
| KR | 10-2008-0064395 A | 7/2008 |
| KR | 10-2011-0056561 A | 5/2011 |
| KR | 10-2012-0040693 A | 4/2012 |
| KR | 10-2013-0027326 A | 3/2013 |
| KR | 10-2013-0063019 A | 6/2013 |
| KR | 10-2013-0075783 A | 7/2013 |
| KR | 10-2013-0082190 A | 7/2013 |
| KR | 10-2013-0116905 A | 10/2013 |
| KR | 10-2014-0018019 A | 2/2014 |
| KR | 10-2014-0026263 A | 3/2014 |
| KR | 10-2014-0055429 A | 5/2014 |
| TW | 200529636 A | 9/2005 |
| TW | 200601176 A | 1/2006 |
| TW | 200642408 A | 12/2006 |
| TW | 200919255 A | 5/2009 |
| TW | 201131471 A | 9/2011 |
| TW | 201137722 A | 11/2011 |
| TW | 201316247 A | 4/2013 |
| TW | 201324310 A | 6/2013 |
| TW | 201409345 A | 3/2014 |
| TW | 201415345 A | 4/2014 |
| TW | 201416959 A | 5/2014 |
| WO | 97/41528 A1 | 11/1997 |
| WO | 98/58346 A1 | 12/1998 |
| WO | 99/44114 A1 | 9/1999 |
| WO | 00/16244 A1 | 3/2000 |
| WO | 01/59558 A1 | 8/2001 |
| WO | 01-63386 A1 | 8/2001 |
| WO | 01/80017 A1 | 10/2001 |
| WO | 2003/083793 A2 | 10/2003 |
| WO | 2004/029862 A1 | 4/2004 |
| WO | 2004-109454 A2 | 12/2004 |
| WO | 2005/008568 A1 | 1/2005 |
| WO | 2005/020036 A2 | 3/2005 |
| WO | 2005/053225 A1 | 6/2005 |
| WO | 2005/106774 A2 | 11/2005 |
| WO | 2005/109829 A1 | 11/2005 |
| WO | 2006/051462 A1 | 5/2006 |
| WO | 2007/041834 A1 | 4/2007 |
| WO | 2007/060102 A1 | 5/2007 |
| WO | 2007/070014 A1 | 6/2007 |
| WO | 2007/072447 A2 | 6/2007 |
| WO | 2007/076210 A1 | 7/2007 |
| WO | 2001/102110 A2 | 9/2007 |
| WO | 2007/116521 A1 | 10/2007 |
| WO | 2008/008101 A2 | 1/2008 |
| WO | 2010/039337 A2 | 4/2010 |
| WO | 2010/056484 A2 | 5/2010 |
| WO | 2010/077960 A2 | 7/2010 |
| WO | 2010/128442 A2 | 11/2010 |
| WO | WO 2011/074500 A | 6/2011 |
| WO | 2012/028773 A1 | 3/2012 |
| WO | 2012/051052 A1 | 4/2012 |
| WO | 2012/083113 A2 | 6/2012 |
| WO | 2012/126078 A1 | 9/2012 |
| WO | 2013/000150 A1 | 1/2013 |
| WO | 2013/023224 A2 | 2/2013 |
| WO | 2013/096943 A1 | 6/2013 |
| WO | 2013/097895 A1 | 7/2013 |
| WO | 2013/132144 A1 | 9/2013 |
| WO | 2013/135270 A1 | 9/2013 |
| WO | 2013/169842 A2 | 11/2013 |
| WO | 2013/173838 A2 | 11/2013 |
| WO | 2013/177548 A1 | 11/2013 |
| WO | 2014/078965 A1 | 5/2014 |
| WO | 2014/115605 A1 | 7/2014 |
| WO | 2014/147297 A1 | 9/2014 |
| WO | 2014/197279 A1 | 12/2014 |

(56) References Cited

FOREIGN PATENT DOCUMENTS

| | | |
|---|---|---|
| WO | 2015/062410 A1 | 5/2015 |
| WO | 2015/112868 A1 | 7/2015 |
| WO | 2016/201037 A1 | 12/2016 |

OTHER PUBLICATIONS

PCT International Preliminary Report on Patentability for International Application No. PCT/S2012/057656, dated Apr. 10, 2014, 6 pages.
International Preliminary Report on Patentability for corresponding International Application No. PCT/US2012/057319, dated Apr. 10, 2014, 6 pages.
PCT International Search Report and Written Opinion of the International Search Authority for International Application No. PCT/US2012/057319, dated Feb. 25, 2013, (9 pages).
European Patent Examination Report for European Patent Application No. 12770400.5, dated Mar. 10, 2015; 3pgs.
Certification of Examination received for Australian Patent Application No. 2017100553, dated Jan. 17, 2018, 2 pages.
Corrected Notice of Allowance received for U.S. Appl. No. 15/269,801, dated Oct. 3, 2017, 4 pages.
Decision to Grant received for Danish Patent Application No. PA201670628, dated Nov. 20, 2017, 2 pages.
Final Office Action received for U.S. Appl. No. 13/248,882, dated Dec. 4, 2013, 22 pages.
Final Office Action received for U.S. Appl. No. 14/285,378, dated Jul. 23, 2015, 19 pages.
Final Office Action received for U.S. Appl. No. 15/250,152, dated Aug. 23, 2017, 24 pages.
Intention to Grant received for Danish Patent Application No. PA201670628, dated Aug. 28, 2017, 2 pages.
International Search Report and Written Opinion received for PCT Patent Application No. PCT/US2017/032240, dated Sep. 21, 2017, 33 pages.
Invitation to Pay Additional Fee received for PCT Patent Application No. PCT/US17/32240, dated Jul. 12, 2017, 2 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/642,366, dated Aug. 24, 2015, 7 pages.
Non-Final Office Action received for U.S. Appl. No. 15/269,801, dated Dec. 30, 2016, 17 pages.
Non-Final Office Action received for U.S. Appl. No. 15/250,152, dated Mar. 2, 2017, 26 pages.
Notice of Allowance received for Chinese Patent Application No. 20120047459.6, dated Jan. 31, 2018, 2 pages (1 page of English Translation and 1 page of Official Copy).
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/285,378, dated May 19, 2016, 10 pages.
Notice of Allowance received for U.S. Appl. No. 14/642,366, dated Jan. 14, 2016, 8 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Office Action received for Australian Patent Application No. 2017100553, dated Aug. 4, 2017, 5 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770782, dated Jan. 26, 2018, 8 pages.
Office Action received for European Patent Application No. 12773460.6, dated Feb. 19, 2018, 6 pages.
Office Action received for Korean Patent Application No. 10-2016-7035555, dated Dec. 26, 2017, 5 pages (2 pages of English Translation and 3 pages of Official Copy).
Summons to Attend Oral Proceedings received for European Patent Application No. 12770400.5, dated Mar. 19, 2018, 10 pages.
Advisory Action received for U.S. Appl. No. 12/207,374, dated Feb. 25, 2013, 3 pages.
Advisory Action received for U.S. Appl. No. 12/207,374, dated May 15, 2014, 3 pages.
Advisory Action received for U.S. Appl. No. 14/311,214, dated Feb. 10, 2015, 4 pages.
Advisory Action received for U.S. Appl. No. 14/503,296, dated Oct. 2, 2015, 3 pages.
Advisory Action received for U.S. Appl. No. 15/137,944, dated May 11, 2017, 6 pages.
Akhgari, Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Beard, Chris, "Mozilla Labs Introducing Weave", available online at <https://blog.mozilla.org/labs/2007/12/introducing-weave/>, Dec. 21, 2007, 57 pages.
Bell, Killian, "Twitter Notifications, Icloud Tabs & Location-based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Certificate of Examination received for Australian Patent Application No, 2017101425, dated Jan. 17, 2018, 2 pages.
Chan, Christine, "Handoff Your Browser to Your iPhone or iPad! Plus a Chance to Win a Copy!" Apr. 12, 2011, 2 pages.
Corrected Notice of Allowance received for U.S. Appl. No. 15/017,436, dated Sep. 2, 2016, 5 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/357,873, dated Jan. 19, 2018, 2 pages.
Corrected Notice of Allowance received for U.S. Appl. No. 15/357,873, dated Mar. 16, 2018, 2 pages.
Decision from Intellectual Property Tribunal received for Korean Patent Application No. 10-2011-7023152, dated Feb. 17, 2015, 22 pages (7 pages of English Translation and 15 pages of Official copy).
Decision to Grant received for Danish Patent Application No. PA201670042, dated Mar. 19, 2018, 2 pages.
Decision to Grant received for European Patent Application No. 04753978.8, dated Apr. 16, 2015, 2 pages.
Decision to Grant received for the European Patent Application No. 12181538.5, dated Jul. 2, 2015, 1 page.
Decision to Grant received for European Patent Application No. 15724160.5, dated Jun. 14, 2018, 2 pages.
Decision to Refusal received for Japanese Patent Application No, 2013-145795, dated Mar. 4, 2016, 8 pages (4 pages of English Translation and 4 pages of Official copy).
Decision to Refuse received for European Patent Application No. 08834386.8, dated Apr. 8, 2013, 8 pages.
"Does Apple Pay Change Payment?" Nov. 1, 2014, 11 pages (4 pages of English Translation and 7 pages of Official copy).
Dybwad, Barb, "Google Chrome Gets Bookmark Syncing", available online at "http://mashable.com/2009/11/02/chrome-bookmark-sync/", Nov. 3, 2009, 6 pages.
European Search Report received for European Patent Application No. 04753978.8, dated Feb. 22, 2010, 3 pages.

(56) References Cited

OTHER PUBLICATIONS

Evaluation Report for Utility Model Patent received for Chinese Patent Application No. 201620051290.7, dated Sep. 19, 2016, 11 pages (6 pages of English Translation and 5 pages of Official copy).
Examination Report received for Australian Patent Application No. 2015202397, dated Feb. 29, 2016, 4 pages.
Examiner Interview Summary received for U.S. Appl. No. 12/732,946, dated Jan. 26, 2015, 4 pages.
Examiner's Pre-review Report received for Japanese Patent Application No. 2013-098406, dated Oct. 8, 2015, 7 pages (4 pages of English Translation and 3 pages of Official copy).
Extended European Search Report (includes Partial European Search Report and European Search Opinion) received for European Patent Application No. 13171145.9, dated Feb. 5, 2014, 6 pages.
Extended European Search Report (includes Partial European Search Report and European Search Opinion) received for European Patent Application No. 15168475.0, dated Oct. 21, 2015, 6 pages.
Extended European Search Report received for European Patent Application No. 12181538.5, dated Oct. 23, 2012, 6 pages.
Extended European Search Report received for European Patent Application No. 13171047,7, dated Oct. 29, 2014, 8 pages.
Extended European Search Report received for European Patent Application No. 14853215.3, dated Sep. 13, 2016, 9 pages.
Extended European Search Report received for European Patent Application No. 16177139.9, dated Nov. 4, 2016, 7 pages.
Extended European Search Report received for European Patent Application No. 16201159.7, dated Mar. 27, 2017, 12 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Final Office Action received for Korean Patent Application No. 10-2014-7004772, dated Oct. 21, 2014, 5 pages. (2 pages of English Translation and 3 pages of Official copy).
Final Office Action received for U. S. Appl. No. 14/503,327, dated May 18, 2017, 10 pages.
Final Office Action received for U.S. Appl. No. 10/997,291, dated Jan. 2, 2008, 5 pages.
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Final Office Action received for U.S. Appl. No. 12/732,946, dated Oct. 9, 2014, 34 pages.
Final Office Action received for U.S. Appl. No. 13/243,045, dated Aug. 5, 2015, 10 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 14/142,669, dated Jun. 12, 2015, 14 pages.
Final Office Action received for U.S. Appl. No. 14/311,214, dated Jan. 8, 2015, 12 pages.
Final Office Action received for U.S. Appl. No. 14/311,214, dated Sep. 24, 2015, 15 pages.
Final Office Action received for U.S. Appl. No. 14/479,088, dated Mar. 11, 2015, 10 pages.
Final Office Action received for U.S. Appl. No. 14/480,183, dated Jun. 28, 2017, 14 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/612,214, dated Dec. 7, 2015, 13 pages.
Final Office Action received for U.S. Appl. No. 14/640,020, dated Jul. 16, 2015, 26 pages.
Final Office Action received for U.S. Appl. No. 14/641,289, dated Jul. 1, 2016, 32 pages.
Final Office Action received for U.S. Appl. No. 14/641,298, dated Oct. 4, 2017, 30 pages.
Final Office Action received for U.S. Appl. No. 14/719,217, dated Feb. 23, 2017, 37 pages.
Final Office Action received for U.S. Appl. No. 14/869,831, dated Aug. 2, 2016, 14 pages.
Final Office Action received for U.S. Appl. No. 14/869,831, dated May 19, 2017, 20 pages.
Final Office Action received for U.S. Appl. No. 14/870,694, dated Apr. 7, 2017, 16 pages.
Final Office Action received for U.S. Appl. No. 15/137,944, dated Feb. 27, 2017, 10 pages.
Final Office Action received for U.S. Appl. No. 15/470,752, dated Mar. 13, 2018, 14 pages.
"Firefox Sync—Take Your Bookmarks, Tabs and Personal Information with You", Jun. 1, 2012, 3 pages.
Frakes, Dan, "How to Get Started with Airplay", available at: https://www.macworld.com/article/2039770/how-to-get-started-with-airplay.html, Macworld, May 27, 2013, 8 pages.
"G Pad", Nov. 19, 2013, 38 pages (2 pages of English Translation and 36 pages of Official copy).
Google Labs, "Google Browser Sync", available online at "https://web.archive.org/web/20120518050142/http://www.google.com/tools/firefox/browsersync/faq.html", May 18, 2012, 5 pages.
Idex, "Idex Fingerprint Sensor Mobile Glass Display", Youtube, available at <https://www.youtube.com/watch?v=X1dAIP5sFzw>, Apr. 11, 2013, 2 pages.
Intention to Grant received for Danish Patent Application No. PA201670042, dated Jan. 29, 2018, 2 pages.
Intention to Grant received for European Patent Application No. 04753978.8, dated Dec. 4, 2014, 5 pages.
Intention to Grant received for European Patent Application No. 12181538.5, dated Feb. 20, 2015, 8 pages.
Intention to Grant received for European Patent Application No. 15724160.5, dated Mar. 7, 2018, 8 pages.
Intention to Grant received for European Patent Application No. 14853215.3, dated Jun. 27, 2018, 9 pages.
International Preliminary Report on Patentability received for PCT Patent Application No. PCT/US2004/017270, dated Jul. 23, 2013, 3 pages.
International Preliminary Report on Patentability received for PCT Patent Application No. PCT/US2008/075738, dated Jan. 28, 2010, 15 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2014/054800, dated Mar. 31, 2016, 27 pages.
International Preliminary Report on Patentability received for PCT Patent Application No. PCT/US2015/019306, dated Dec. 15, 2016, 10 pages.
International Preliminary Report on Patentability received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.

(56) References Cited

OTHER PUBLICATIONS

International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/021012, dated Sep. 21, 2017, 11 pages.
International Search Report and Written Opinion received for PCT Application No. PCT/US2015/019309, dated Jun. 25, 2015, 15 pages.
International Search Report and Written Opinion received for PCT Application No. PCT/US2015/033326, dated Aug. 10, 2015, 13 pages.
International Search Report and Written Opinion received for PCT Patent Application No. PCT/US17/31086, dated Sep. 8, 2017, 15 pages.
International Search Report and Written Opinion received for PCT Patent Application No. PCT/US2004/017270, dated Dec. 1, 2004, 6 pages.
International Search Report and Written Opinion received for PCT Patent Application No. PCT/US2008/075738, dated Jul. 2, 2009, 14 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2014/054800, dated Jan. 29, 2015, 33 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fee received for PCT Patent Application No. PCT/US2017/058368, dated Dec. 14, 2017, 2 pages.
Invitation to Pay Additional Fees received for PCT Patent Application No. PCT/US2014/054800, dated Oct. 31, 2014, 2 pages.
Invitation to Pay Additional Fees received for PCT Patent Application No. PCT/US2015/019317, dated May 22, 2015, 7 pages.
IPHONEBLOG, "los 5.0.1 Security Flaw—Bypass the Passcode—Access Camera Roll", Youtube, available at <https://www.youtube.com/watch?v=qd0Fwgaymb0>, Feb. 24, 2012, 2 pages.
Kimura, Ryoji, "Keynote Presentation Practice Guide for ipad & iphone", K.K. Rutles, first edition, Feb. 29, 2012, 4 pages.
"Kinect Gesture Commands—Kinect Voice Commands", 2013, 2 pages.
Komachi, Aneem, "Time Attendance—Face Recognition—Biometrics", Available at <https://www.youtube.com/watch?v=ascITiiiSbc>, Feb. 9, 2010, 1 page.
Mackie, Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.
Mozilla Services, "Firefox Sync Terms of Service (for Versions Prior to Firefox 29)", available online at <https://services.mozilla.com/tos/>, Aug. 19, 2010, 4 pages.
Naver Blog, "How to Use Smart Wallet and Registered Card", Online Available at <http://feena74.blog.me/140185758401>, Mar. 29, 2013, 20 pages.
Non-Final Action received for U.S. Appl. No. 15/952,736, dated Jun. 1, 2018, 12 pages.
Non-Final Office Action received for U.S. Appl. No. 13/492,057, dated Dec. 17, 2015, 25 pages.
Non-Final Office Action received for U.S. Appl. No. 14/503,327, dated Sep. 12, 2016, 10 pages.
Non-Final Office Action received for U.S. Appl. No. 14/641,304, dated Sep. 11, 2017, 18 pages.
Non-Final Office Action received for U.S. Appl. No. 10/858,290, dated Nov. 24, 2004, 10 pages.
Non-Final Office Action received for U.S. Appl. No. 10/997,291, dated Jul. 28, 2005, 6 pages.
Non-Final Office Action received for U.S. Appl. No. 12/201,568, dated Oct. 2, 2008, 6 pages.
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, 17 pages.
Non-Final Office Action received for U.S. Appl. No. 12/207,374, dated Apr. 15, 2011, 13 pages.
Non-Final Office Action received for U.S. Appl. No. 12/207,374, dated Jun. 7, 2013, 26 pages.
Non-Final Office Action received for U.S. Appl. No. 12/207,374, dated May 24, 2012, 20 pages.
Non-Final Office Action received for U.S. Appl. No. 12/430,702, dated Jun. 24, 2009, 6 pages.
Non-Final Office Action received for U.S. Appl. No. 12/732,946, dated Oct. 17, 2013, 25 pages.
Non-Final Office Action received for U.S. Appl. No. 13/243,045, dated Mar. 17, 2015, 9 pages.
Non-Final Office Action received for U.S. Appl. No. 13/243,326, dated Feb. 14, 2013, 13 pages.
Non-Final Office Action received for U.S. Appl. No. 13/492,057, dated Jul. 8, 2014, 14 pages.
Non-Final Office Action received for U.S. Appl. No. 14/142,669, dated Oct. 28, 2015, 14 pages.
Non-Final Office Action received for U.S. Appl. No. 14/142,669, dated Sep. 12, 2014, 11 pages.
Non-Final Office Action received for U.S. Appl. No. 14/311,214, dated Apr. 10, 2015, 12 pages.

(56) References Cited

OTHER PUBLICATIONS

Non-Final Office Action received for U.S. Appl. No. 14/311,214, dated Sep. 18, 2014, 10 pages.
Non-Final Office Action received for U.S. Appl. No. 14/479,088, dated Jul. 6, 2015, 10 pages.
Non-Final Office Action received for U.S. Appl. No. 14/479,088, dated Nov. 18, 2014, 8 pages.
Non-Final Office Action received for U.S. Appl. No. 14/480,183, dated Oct. 18, 2016, 12 pages.
Non-Final Office Action received for U.S. Appl. No. 14/503,072, dated Jan. 26, 2015, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Jan. 30, 2015, 16 pages.
Non-Final Office Action received for U.S. Appl. No. 14/503,296, dated Oct. 5, 2016, 11 pages.
Non-Final Office Action received for U.S. Appl. No. 14/503,381, dated May 13, 2015, 13 pages.
Non-Final Office Action received for U.S. Appl. No. 14/612,214, dated Jul. 29, 2015, 12 pages.
Non-Final Office Action received for U.S. Appl. No. 14/640,020, dated Apr. 29, 2015, 18 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/641,298, dated Mar. 6, 2017, 26 pages.
Non-Final Office Action received for U.S. Appl. No. 14/719,217, dated Jul. 28, 2016, 28 pages.
Non-Final Office Action received for U.S. Appl. No. 14/841,455, dated Apr. 25, 2018, 13 pages.
Non-Final Office Action received for U.S. Appl. No. 14/870,694, dated Sep. 23, 2016, 13 pages.
Non-Final Office Action received for U.S. Appl. No. 15/128,952, dated Dec. 29, 2017, 13 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/274,086, dated Jan. 11, 2017, 21 pages.
Non-Final Office Action received for U.S. Appl. No. 15/294,439, dated Jan. 26, 2018, 18 pages.
Non-Final Office Action received for U.S. Appl. No. 15/470,752, dated Jul. 28, 2017, 11 pages.
Non-Final Office Action received for U.S. Appl. No. 15/620,666, dated Mar. 28, 2018, 14 pages.
Non-Final Office Action received for U.S. Appl. No. 15/872,685, dated Mar. 27, 2018, 9 pages.
Non-Final Office Action received for U.S. Appl. No. 15/899,966, dated May 4, 2018, 10 pages.
Non-Final Office Action received for U.S. Appl. No. 15/900,047, dated May 8, 2018, 7 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 15/250,152, dated Apr. 6, 2018, 31 pages.
Notice of Acceptance received for Australian Patent Application No. 2008305338, dated Oct. 27, 2011, 1 page.
Notice of Acceptance received for Australian Patent Application No. 2014334869, dated Jan. 3, 2018, 3 pages.
Notice of Acceptance received for Australian Patent Application No. 2015201884, dated Oct. 4, 2016, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2015267671, dated Apr. 4, 2018, 3 pages.
Notice of Acceptance received for Australian Patent Application No. 2016201310, dated Feb. 21, 2018, 3 pages.
Notice of Acceptance received for Australian Patent Application No. 2016203896, dated Mar. 2, 2018, 3 pages.
Notice of Acceptance received for Australian Patent Application No. 2016203898, dated Feb. 21, 2018, 3 pages.
Notice of Acceptance received for Australian Patent Application No. 2016211504, dated Oct. 17, 2017, 3 pages.
Notice of Acceptance received for Australian Patent Application No. 2016230001, dated May 25, 2018, 3 pages.
Notice of Acceptance received for Australian Patent Application No. 2017201064, dated Feb. 20, 2018, 3 pages.
Notice of Allowance received for Australian Patent Application No. 2015202397, dated Feb. 15, 2017, 3 pages.
Notice of Allowance received for Canadian Patent Application No. 2,527,829, dated Feb. 1, 2016, 1 page.
Notice of Allowance received for Chinese Patent Application No. 200880108306.1, dated Oct. 28, 2014, 2 pages (Official copy only) (See Communication under 37 CFR § 1.98(a) (3)).
Notice of Allowance received for Chinese Patent Application No. 201520357381.9, dated Jul. 29, 2015, 4 pages (2 pages of English Translation and 2 pages of Official copy).
Notice of Allowance received for Chinese Patent Application No. 201520358683.8, dated Mar. 10, 2016, 5 pages (3 pages of English Translation and 2 pages of Official copy).
Notice of Allowance received for Chinese Patent Application No. 201620051290.7, dated Jun. 22, 2016, 2 pages (Official copy only) (See Communication under 37 CFR § 1.98(a) (3)).
Notice of Allowance received for Chinese Patent Application No. 201620480708.6, dated Apr. 20, 2017, 3 pages (2 pages of English Translation and 1 page of Official copy).
Notice of Allowance received for Chinese Patent Application No. 201620480846.4, dated Apr. 20, 2017, 3 pages (2 pages of English Translation and 1 page of Official copy).
Notice of Allowance received for Chinese Patent Application No. 201520364847.8, dated Nov. 5, 2015, 9 pages (7 page of English Translation and 2 pages of Official copy).
Notice of Allowance received for Japanese Patent Application No. 2006-533547, dated May 15, 2015, 2 pages (Official copy only) (See Communication under 37 CFR § 1.98(a) (3)).
Notice of Allowance received for Japanese Patent Application No. 2013-098406, dated Jan. 23, 2017, 18 pages (Official copy only) (See Communication under 37 CFR § 1.98(a) (3)).
Notice of Allowance received for Japanese Patent Application No. 2015-083696, dated Jan. 6, 2017, 3 pages (Official copy only) (See Communication under 37 CFR § 1.98(a) (3)).
Notice of Allowance received for Japanese Patent Application No. 2015-095183, dated Apr. 21, 2017, 3 pages (Official copy only) (See Communication under 37 CFR § 1.98(a) (3)).
Notice of Allowance received for Japanese Patent Application No. 2016-224508, dated Jun. 20, 2017, 3 pages (Official copy only) (See Communication under 37 CFR § 1.98(a) (3)).
Notice of Allowance received for Japanese Patent Application No. 2016-540927, dated May 14, 2018, 4 pages (1 page of English Translation and 3 pages of Official copy).
Notice of Allowance received for Japanese Patent Application No. 2016-569669, dated Mar. 19, 2018, 4 pages (1 page of English Translation and 3 pages of Official copy).
Notice of Allowance received for Japanese Patent Application No. 2017-013383, dated Mar. 31, 2017, 3 pages (Official copy only) (See Communication under 37 CFR § 1.98(a) (3)).
Notice of Allowance received for Korean Patent Application No. 10-2010-7008899, dated Feb. 12, 2016, 3 pages (1 page of English Translation and 2 pages of Official copy).

(56) References Cited

OTHER PUBLICATIONS

Notice of Allowance received for Korean Patent Application No. 10-2014-7004771, dated Oct. 29, 2015, 3 pages (1 page of English Translation and 2 pages of Official copy).
Notice of Allowance received for Korean Patent Application No. 10-2014-7004772, dated Feb. 12, 2016, 4 pages (1 page of English Translation and 3 pages of Official copy).
Notice of Allowance received for Korean Patent Application No. 10-2014-7004773, dated Jan. 7, 2016, 3 pages (1 page English Translation and 2 pages of Official copy).
Notice of Allowance received for Korean Patent Application No. 10-2014-7025441, dated Feb. 26, 2016, 3 pages (1 page English Translation and 2 pages of Official copy).
Notice of Allowance received for Korean Patent Application No. 10-2015-0072162, dated Dec. 27, 2017, 4 pages (2 pages of English Translation and 2 pages of Official copy).
Notice of Allowance received for Korean Patent Application No. 10-2015-7004548, dated Feb. 26, 2016, 3 pages (1 page English Translation and 2 pages of Official copy).
Notice of Allowance received for Korean Patent Application No. 10-2016-7009347, dated May 10, 2018, 4 pages (1 page of English Translation and 3 pages of Official copy).
Notice of Allowance received for Korean Patent Application No. 10-2017-0022365, dated Mar. 27, 2018, 4 pages (1 page of English Translation and 3 pages of Official copy).
Notice of Allowance received for Korean Patent Application No. 10-2017-0022546, dated Feb. 27, 2018, 4 pages (1 page of English Translation and 3 pages of Official copy).
Notice of Allowance received for Korean Patent Application No. 10-2017-7024513, dated Apr. 20, 2018, 5 pages (2 page of English Translation and 3 pages of Official copy).
Notice of Allowance received for Taiwan Patent Application No. 097134592, dated Aug. 12, 2014, 3 pages (Official copy only) (See Communication under 37 CFR § 1.98(a) (3)).
Notice of Allowance received for Taiwan Patent Application No. 101107082, dated Oct. 22, 2014, 2 pages (Official copy only) (See Communication under 37 CFR § 1.98(a) (3)).
Notice of Allowance received for Taiwan Patent Application No. 102120412, dated Oct. 28, 2015, 5 pages (2 pages of English Translation and 3 pages of Official copy).
Notice of Allowance received for Taiwanese Patent Application No. 103131074, dated Nov. 17, 2015, 3 pages (Official copy only) (See Communication under 37 CFR § 1.98(a) (3)).
Notice of Allowance received for Taiwanese Patent Application No. 103136545, dated Nov. 27, 2017, 4 pages (1 page of English Translation of Search Report and 3 pages of Official copy).
Notice of Allowance received for Taiwanese Patent Application No. 104108223, dated Jan. 10, 2017, 3 pages (Official copy only) (See Communication under 37 CFR § 1.98(a) (3)).
Notice of Allowance received for Taiwanese Patent Application No. 1041114953, dated Oct. 17, 2017, 3 pages (Official copy only) (See Communication under 37 CFR § 1.98(a) (3)).
Notice of Allowance received for Taiwanese Patent Application No. 1041117041, dated Feb. 24, 2017, 3 pages. (Official copy only) (See Communication under 37 CFR § 1.98(a) (3)).
Notice of Allowance received for Taiwanese Patent Application No. 104140890, dated Oct. 25, 2017, 5 pages (Official copy only) (See Communication under 37 CFR § 1.98(a) (3)).
Notice of Allowance received for Taiwanese Patent Application No. 104117042, dated Nov. 17, 2017, 5 pages (2 pages of English Translation and 3 pages of Official copy).
Notice of Allowance received for U.S. Appl. No. 14/503,381, dated Dec. 16, 2015, 8 pages.
Notice of Allowance received for U.S. Appl. No. 14/640,020, dated Dec. 15, 2015, 7 pages.
Notice of Allowance received for U.S. Appl. No. 10/997,291, dated Jun. 27, 2008, 16 pages.
Notice of Allowance received for U.S. Appl. No. 12/201,568, dated Dec. 17, 2008, 6 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Notice of Allowance received for U.S. Appl. No. 12/430,702, dated Nov. 16, 2009, 6 pages.
Notice of Allowance received for U.S. Appl. No. 12/604,814, dated Apr. 26, 2010, 4 pages.
Notice of Allowance received for U.S. Appl. No. 12/604,814, dated Aug. 5, 2010, 4 pages.
Notice of Allowance received for U.S. Appl. No. 12/604,814, dated Nov. 12, 2010, 4 pages.
Notice of Allowance received for U.S. Appl. No. 13/243,326, dated Sep. 23, 2013, 11 pages.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 14/142,657, dated Jan. 8, 2015, 5 pages.
Notice of Allowance received for U.S. Appl. No. 14/142,657, dated Jul. 23, 2015, 2 pages.
Notice of Allowance received for U.S. Appl. No. 14/142,657, dated Jun. 29, 2015, 7 pages.
Notice of Allowance received for U.S. Appl. No. 14/142,657, dated Sep. 10, 2014, 9 pages.
Notice of Allowance received for U.S. Appl. No. 14/142,661, dated Aug. 3, 2015, 10 pages.
Notice of Allowance received for U.S. Appl. No. 14/142,661, dated Dec. 3, 2015, 2 pages.
Notice of Allowance received for U.S. Appl. No. 14/142,661, dated Sep. 28, 2015, 9 pages.
Notice of Allowance received for U.S. Appl. No. 14/142,669, dated Aug. 25, 2016, 2 pages.
Notice of Allowance received for U.S. Appl. No. 14/142,669, dated Jun. 14, 2016, 5 pages.
Notice of Allowance received for U.S. Appl. No. 14/142,669, dated Sep. 21, 2016, 2 pages.
Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Notice of Allowance received for U.S. Appl. No. 14/479,088, dated Dec. 23, 2015, 5 pages.
Notice of Allowance received for U.S. Appl. No. 14/479,088, dated Jan. 11, 2016, 2 pages.
Notice of Allowance received for U.S. Appl. No. 14/479,088, dated Mar. 9, 2016, 2 pages.
Notice of Allowance received for U.S. Appl. No. 14/479,088, dated Nov. 12, 2015, 7 pages.
Notice of Allowance received for U.S. Appl. No. 14/480,183, dated Nov. 29, 2017, 7 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/503,364, dated Jun. 16, 2016, 11 pages.
Notice of Allowance received for U.S. Appl. No. 14/641,289, dated Aug. 24, 2017, 6 pages.

(56) References Cited

OTHER PUBLICATIONS

Notice of Allowance received for U.S. Appl. No. 14/641,289, dated Dec. 12, 2017, 5 pages.
Notice of Allowance received for U.S. Appl. No. 14/661,796, dated Jul. 7, 2015, 10 pages.
Notice of Allowance received for U.S. Appl. No. 14/661,796, dated Jul. 23, 2015, 2 pages.
Notice of Allowance received for U.S. Appl. No. 14/873,023, dated Dec. 23, 2015, 10 pages.
Notice of Allowance received for U.S. Appl. No. 14/873,023, dated Jan. 14, 2016, 2 pages.
Notice of Allowance received for U.S. Appl. No. 15/017,436, dated May 27, 2016, 17 pages.
Notice of Allowance received for U.S. Appl. No. 15/137,944, dated Dec. 21, 2017, 8 pages.
Notice of Allowance received for U.S. Appl. No. 15/274,086, dated Jun. 7, 2017, 8 pages
Notice of Allowance received for U.S. Appl. No. 15/274,086, dated Oct. 19, 2017, 9 pages.
Notice of Allowance received for U.S. Appl. No. 15/357,873, dated Aug. 23, 2017, 10 pages.
Notice of Allowance received for U.S. Appl. No. 15/357,873, dated Jan. 8, 2018, 9 pages.
Notice of Allowance received for U.S. Appl. No. 15/899,996, dated Apr. 24, 2018, 9 pages.
Notice of Allowance received for U.S. Appl. No. 14/311,214, dated Jan. 21, 2016, 7 pages.
Notice of Final Rejection received for Korean Patent Application No. 10-2014-7004773, dated Jun. 12, 2015, 6 pages (3 pages English Translation and 3 pages of Official copy).
Notice of Preliminary Rejection for Korean Patent Application No. 10-2014-7025441, dated Jun. 12, 2015, 9 pages (4 pages of English Translation and 5 pages of Official copy).
Notice of Preliminary Rejection received for Korean Patent Application No. 10-2015-7004548, dated Jun. 12, 2015, 8 pages (4 pages of English Translation and 4 pages of Official copy).
Notice of Preliminary Rejection received from Korean Patent Application No. 10-2015-7010262, dated Jun. 12, 2015, 5 pages (2 pages of English Translation and 3 pages of Official copy).
Office Action received for Australian Patent Application No. 2015201884, dated Oct. 12, 2015, 4 pages.
Office Action received for Australian Patent Application No. 2008305338, dated Mar. 21, 2011, 3 pages.
Office Action received for Australian Patent Application No. 2008305338, dated Oct. 19, 2010, 3 pages.
Office Action received for Australian Patent Application No. 2012200716, dated Jul. 16, 2014, 4 pages.
Office Action received for Australian Patent Application No. 2012200716, dated Nov. 15, 2013, 3 pages.
Office Action received for Australian Patent Application No. 2014204462, dated May 8, 2015, 4 pages.
Office Action received for Australian Patent Application No. 2014204462, dated Apr. 29, 2016, 3 pages.
Office Action received for Australian Patent Application No. 2014334869, dated Jan. 11, 2017, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015100708, dated Sep. 8, 2015, 4 pages.
Office Action received for Australian Patent Application No. 2015100709, dated Sep. 9, 2015 (examination Report 1), 4 pages.
Office Action received for Australian Patent Application No. 2015100709, dated Sep. 9, 2015 (examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2015267671, dated Apr. 5, 2017, 2 pages.
Office Action received for Australian Patent Application No. 2015302298, dated Apr. 4, 2018, 3 pages.
Office Action received for Australian Patent Application No. 2015302298, dated Sep. 14, 2017, 3 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016102031, dated Feb. 28, 2017, 4 pages.
Office Action received for Australian Patent Application No. 2016201310, dated Feb. 28, 2017, 3 pages.
Office Action received for Australian Patent Application No. 201603896, dated Jan. 19, 2018, 4 pages.
Office Action received for Australian Patent Application No. 2016203896, dated Mar. 6, 2017, 3 pages.
Office Action received for Australian Patent Application No. 2016203898, dated Dec. 19, 2017, 4 pages.
Office Action received for Australian Patent Application No. 2016203898, dated Feb. 17, 2017, 3 pages.
Office Action received for Australian Patent Application No. 2016230001, dated Feb. 7, 2018, 3 pages.
Office Action received for Australian Patent Application No. 2016266010, dated May 4, 2018, 4 pages.
Office Action received for Australian Patent Application No. 2016266010, dated Nov. 30, 2017, 5 pages.
Office Action received for Australian Patent Application No. 2017100070, dated Mar. 16, 2017, 6 pages.
Office Action received for Australian Patent Application No. 2017100558, dated Feb. 27, 2018, 3 pages.
Office Action received for Australian Patent Application No. 2017100558, dated Sep. 1, 2017, 5 pages.
Office Action received for Australian Patent Application No. 2017101563, dated Jan. 22, 2018, 2 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2018203732, dated Jun. 21, 2018, 3 pages.
Office Action received for Canadian Patent Application No. 2,527,829, dated Apr. 16, 2014, 3 pages.
Office Action received for Canadian Patent Application No. 2,527,829, dated Apr. 29, 2013, 3 pages.
Office Action received for Canadian Patent Application No. 2,527,829, dated Apr. 29, 2015, 6 pages.
Office Action received for Canadian Patent Application No. 2,527,829, dated Jun. 1, 2011, 3 pages.
Office Action received for Canadian Patent Application No. 2,527,829, dated May 7, 2012, 4 pages.
Office Action received for Chinese Patent Application No. 200880108306.1, dated Aug. 24, 2011, 10 pages. (English Translation only).
Office Action received for Chinese Patent Application No. 200880108306.1, dated Mar. 20, 2012, 8 pages. (English Translation only).
Office Action received for Chinese Patent Application No. 200880108306.1, dated Mar. 27, 2014, 6 pages (3 pages of English Translation and 3 pages of Office Action).

(56) References Cited

OTHER PUBLICATIONS

Office Action received for Chinese Patent Application No. 201410407626.4, dated Oct. 31, 2016, 10 pages (4 pages of English Translation and 6 pages of Official copy).
Office Action received for Chinese Patent Application No. 201410407626.4, dated Sep. 11, 2017, 11 pages (3 pages of English Translation and 8 pages of Official copy).
Office Action received for Chinese Patent Application No. 201520358683.8, dated Sep. 2, 2015, 4 pages (2 pages of English Translation and 2 pages of Official copy).
Office Action received for Chinese Patent Application No. 201620101636.x, dated May 25, 2016, 3 pages (1 pages of English Translation and 2 pages of Official copy).
Office Action received for Chinese Patent Application No. 201620101636.x, dated Oct. 13, 2016, 3 pages (1 page of English Translation and 2 pages of Official copy).
Office Action received for Chinese Patent Application No. 201620480708.6, dated Jan. 9, 2017, 3 pages (1 pages of English Translation and 2 pages of Official copy).
Office Action received for Chinese Patent Application No. 201620480708.6, dated Sep. 14, 2016, 3 pages (1 page of English Translation and 2 pages of Official copy).
Office Action received for Chinese Patent Application No. 201620480846.4, dated Jan. 9, 2017, 3 pages (1 page of English Translation and 2 pages of Official copy).
Office Action received for Chinese Patent Application No. 201620480846.4, dated Sep. 14, 2016, 3 pages (1 page of English Translation and 2 pages of Official copy).
Office Action received for Chinese Patent Application No. 201480058054.1, dated May 3, 2018, 18 pages (4 pages of English Translation and 14 pages of Official Copy).
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201670622, dated May 30, 2017, 4 pages.
Office Action received for Danish Patent Application No. PA201670622, dated Nov. 1, 2017, 5 pages.
Office Action received for Danish Patent Application No. PA201670622, dated Oct. 31, 2016, 11 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Sep. 6, 2017, 4 pages.
Office Action received for Danish Patent Application No. PA201770804, dated Feb. 1, 2018, 9 pages.
Office Action received for Danish Patent Application No. PA201570256, dated Oct. 10, 2016, 3 pages.
Office Action received for Danish Patent Application No. PA201770804, dated May 31, 2018, 6 pages.
Office Action received for European Patent Application No. 04753978.8, dated Jan. 31, 2013, 6 pages.
Office Action received for European Patent Application No. 04753978.8, dated Mar. 27, 2012, 7 pages.
Office Action received for European Patent Application No. 08834386.8, dated Aug. 23, 2010, 4 pages.
Office Action received for European Patent Application No. 12181538.5, dated Dec. 16, 2013, 4 pages.
Office Action received for European Patent Application No. 13171047.7, dated May 24, 2017, 7 pages.
Office Action received for European Patent Application No. 13171145.9, dated Apr. 28, 2016, 5 pages.
Office Action received for European Patent Application No. 13171145.9, dated May 3, 2018, 4 pages.
Office Action received for European Patent Application No. 15168475.0, dated Dec. 19, 2016, 5 pages.
Office Action received for European Patent Application No. 15711969.4, dated Nov. 17, 2017, 9 pages.
Office Action received for European Patent Application No. 15713062.6, dated Dec. 6, 2017, 7 pages.
Office Action received for European Patent Application No. 15727291.5, dated Jan. 15, 2018, 8 pages.
Office Action received for European Patent Application No. 15728352.4, dated Jan. 25, 2018, 10 pages.
Office Action received for European Patent Application No. 16201195.1, dated Feb. 14, 2018, 12 pages.
Office Action received for European Patent Application No. 16201205.8, dated Feb. 16, 2018, 12 pages.
Office Action received for German Patent Application No. 2020150042678, dated Nov. 4, 2015, 4 pages (3 pages of English Translation and 1 pages of Official copy).
Office Action received for German Patent Application No. 202017005507.4, dated Feb. 5, 2018, 2 pages (1 page of English Translation and 1 page of Official copy).
Office Action received for Hong Kong Patent Application No. 151051633, dated Jun. 5, 2015, 11 pages (Official copy only) (See Communication under 37 CFR § 1.98(a) (3)).
Office Action received for Japanese Patent Application No. 2006-533547, dated Aug. 14, 2008, 1 page (English Translation only).
Office Action received for Japanese Patent Application No. 2006-533547, dated Mar. 22, 2011, 2 pages (English Translation only).
Office Action received for Japanese Patent Application No. 2006-533547, dated Mar. 5, 2012, 13 pages (Official copy only) (See Communication under 37 CFR § 1.98(a) (3)).
Office Action received for Japanese Patent Application No. 2010-525891, dated Jun. 12, 2012, 11 pages. (5 pages of English Translation and 6 pages of Official copy).
Office Action received for Japanese Patent Application No. 2013-098406, dated Dec. 9, 2013, 12 pages (6 pages of English Translation and 6 pages of Official copy).
Office Action received for Japanese Patent Application No. 2013-098406, dated Dec. 15, 2014, 12 pages (7 pages of English Translation and 5 pages of Official copy).
Office Action received for Japanese Patent Application No. 2013-098406, dated Jul. 19, 2016, 10 pages (5 pages of English Translation and 5 pages of Official copy).
Office Action received for Japanese Patent Application No. 2013-145795, dated Apr. 14, 2017, 18 pages (3 pages of English Translation and 15 pages of Official copy).
Office Action received for Japanese Patent Application No. 2013-145795, dated Jun. 13, 2014, 6 pages (3 pages of English Translation and 3 pages of Official copy).
Office Action received for Japanese Patent Application No. 2014-242264, dated Feb. 24, 2017, 14 pages (7 pages of English Translation and 7 pages of Official copy).
Office Action received for Japanese Patent Application No. 2014-242264, dated Jul. 17, 2015, 6 pages (3 pages English Translation and 3 pages of Official copy).
Office Action received for Japanese Patent Application No. 2014-242264, dated May 9, 2016, 10 pages (5 pages of English Translation and 5 pages of Official copy).
Office Action received for Japanese Patent Application No. 2015-083696, dated Jun. 17, 2016, 12 pages (7 pages of English Translation and 5 pages of Official copy).
Office Action received for Japanese Patent Application No. 2015095183, dated Jun. 3, 2016, 13 pages (6 pages of English Translation and 7 pages of Official copy).

(56) References Cited

OTHER PUBLICATIONS

Office Action received for Japanese Patent Application No. 2016-131998, dated Sep. 25, 2017, 10 pages (5 pages of English Translation and 5 pages of Official copy).
Office Action received for Japanese Patent Application No. 2016-224507, dated Dec. 1, 2017, 14 pages (7 pages of English Translation and 7 pages of Official copy).
Office Action received for Japanese Patent Application No. 2016-224507, dated Jun. 16, 2017, 16 pages (8 pages of English Translation and 8 pages of Official copy).
Office Action received for Japanese Patent Application No. 2016-540927, dated Jun. 20, 2017, 12 pages (7 pages of English Translation and 5 pages of Official copy).
Office Action received for Japanese Patent Application No. 2016-558332, dated Dec. 8, 2017, 12 pages (6 pages of English Translation and 6 pages of Official copy).
Office Action received for Japanese Patent Application No. 2016-569665, dated Jan. 19, 2018, 10 pages (5 pages of English Translation and 5 pages of Official copy).
Office Action received for Japanese Patent Application No. 2017-540616, dated Jan. 12, 2018, 24 pages (13 pages of English Translation and 11 pages of Official copy).
Office Action received for Japanese Patent Application No. 2017-507413, dated May 25, 2018, 14 pages (7 pages of English Translation and 7 pages of Official Copy).
Office Action received for Korean Patent Application No. 10-2010-7008899, dated Aug. 17, 2014, 7 pages (3 pages of English Translation and 4 pages of Official copy).
Office Action received for Korean Patent Application No. 10-2010-7008899, dated Feb. 3, 2015, 7 pages (3 pages of English Translation and 4 pages of Official copy).
Office Action received for Korean Patent Application No. 10-2010-7008899, dated Jan. 28, 2013, 5 pages (2 pages of English Translation and 3 pages of Official copy).
Office Action received for Korean Patent Application No. 10-2010-7008899, dated Jun. 12, 2015, 4 pages (2 pages of English Translation and 2 pages of Official copy).
Office Action received for Korean Patent Application No. 10-2010-7008899, dated Mar. 29, 2012, 6 pages (2 pages of English Translation and 4 pages of Official copy).
Office Action received for Korean Patent Application No. 10-2010-7008899, dated May 30, 2011, 4 pages (2 pages of English Translation and 2 pages of Official copy).
Office Action received for Korean Patent Application No. 10-2011-7023152, dated Apr. 22, 2014, 6 pages (3 pages of English Translation and 3 pages of Official copy).
Office Action received for Korean Patent Application No. 10-2014-7004771, dated Apr. 22, 2014, 5 pages (2 pages of English Translation and 3 pages of Official copy).
Office Action received for Korean Patent Application No. 10-2014-7004771, dated Jun. 12, 2015, 6 pages (3 pages English Translation and 3 pages of Official copy).
Office Action received for Korean Patent Application No. 10-2014-7004771, dated Oct. 21, 2014, 7 pages (3 pages of English Translation and 4 pages of Official copy).
Office Action received for Korean Patent Application No. 10-2014-7004772, dated Apr. 22, 2014, 8 pages (3 pages of English Translation and 5 pages of Official copy).
Office Action received for Korean Patent Application No. 10-2014-7004773, dated Apr. 22, 2014, 9 pages (4 pages of English Translation and 5 pages of Office Action).
Office Action received for Korean Patent Application No. 10-2014-7004773, dated Oct. 21, 2014, 9 pages (4 pages of English Translation and 5 pages of Official copy).
Office Action received for Korean Patent Application No. 10-2014-7025441, dated Oct. 21, 2014, 5 pages (2 pages of English Translation and 3 pages of Official copy).
Office Action received for Korean Patent Application No. 10-2015-0072162, dated Apr. 20, 2016, 11 pages (6 pages of English Translation and 5 pages of Official copy).
Office Action received for Korean Patent Application No. 10-2015-0072162, dated Feb. 27, 2017, 12 pages (6 pages of English Translation and 6 pages of Official copy).
Office Action received for Korean Patent Application No. 10-2015-7010262, dated Mar. 8, 2017, 6 pages (3 pages of English Translation and 3 pages of Official copy).
Office Action received for Korean Patent Application No. 10-2015-7010262, dated May 24, 2016, 10 pages (3 pages of English Translation and 7 pages of Official copy).
Office Action received for Korean Patent Application No. 10-2016-0152210, dated May 14, 2018, 13 pages (6 pages of English Translation and 7 pages of Official copy).
Office Action received for Korean Patent Application No. 10-2016-7009347, dated Feb. 18, 2018, 9 pages (4 pages of English Translation and 5 pages of Official copy).
Office Action received for Korean Patent Application No. 10-2016-7009632, dated Feb. 2, 2018, 11 pages (5 pages of English Translation and 6 pages of Official copy).
Office Action received for Korean Patent Application No. 10-2017-0022365, dated Jun. 26, 2017, 10 pages (4 pages of English Translation and 6 pages of Official copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2017-7015582, dated Apr. 5, 2018, 8 pages (4 pages of English Translation and 4 pages of Official copy).
Office Action received for Korean Patent Application No. 10-2017-7015582, dated Jun. 12, 2017, 9 pages (4 pages of English Translation and 5 pages of Official copy).
Office Action received for Korean Patent Application No. 10-2016-7009347, dated Mar. 9, 2017, 15 pages (7 pages of English Translation and 8 pages of Official copy).
Office Action received for Korean Patent Application No. 10-2018-0035949, dated May 20, 2018, 9 pages (4 pages of English Translation and 5 pages of Official Copy).
Office Action received for Taiwan Patent Application No. 103136545, dated May 25, 2016, 7 pages (3 pages of English Translation and 4 pages of Official copy).
Office Action received for Taiwan Patent Application No. 103136545, dated Nov. 2, 2015, 39 pages (15 pages of English Translation and 24 pages of Official copy).
Office Action received for Taiwan Patent Application No. 101107082, dated Jul. 7, 2014, 21 pages (7 pages of English Translation and 14 pages of Official copy).
Office Action received for Taiwan Patent Application No. 103131074, dated Jul. 21, 2015, 16 pages (7 pages of English Translation and 9 pages of Official copy).
Office Action received for Taiwanese Patent Application No. 102120412, dated Feb. 25, 2015, 15 pages (6 pages of English Translation and 9 pages of Official copy).
Office Action received for Taiwanese Patent Application No. 104108223, dated Apr. 25, 2016, 10 pages (5 pages of English Translation and 5 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action received for Taiwanese Patent Application No. 104117041, dated Aug. 22, 2016, 6 pages (3 pages of English Translation and 3 pages of Official copy).
Office Action received for Taiwanese Patent Application No. 104117042, dated Apr. 20, 2017, 18 pages (7 pages of English Translation and 11 pages of Official copy).
Office Action received for Taiwanese Patent Application No. 104117508, dated Jul. 14, 2017, 9 pages (4 pages of English Translation and 5 pages of Official copy).
Office Action received for Taiwanese Patent Application No. 104117508, dated Jul. 20, 2016, 19 pages (8 pages of English Translation and 11 pages of Official copy).

(56) References Cited

OTHER PUBLICATIONS

Office Action received for Taiwanese Patent Application No. 104117508, dated Mar. 20, 2017, 22 pages (9 pages of English Translation and 13 pages of Official copy).

Office Action received for Taiwanese Patent Application No. 106141250, dated May 24, 2018, 7 pages (2 pages of English Translation and 5 pages of Official copy).

Office Action received from Japanese Patent Application No. 2013-098406, dated May 8, 2015, 14 pages (9 pages of English Translation and 5 pages of Official copy).

Office Action received from Japanese Patent Application No. 2013-145795, dated May 8, 2015, 12 pages (7 pages of English Translation and 5 pages of Official copy).

Onefacein, "[how It Works] Securing Your Smartphone with Onefacein", Biometric Password Manager, Available at <https://www.youtube.com/watch?v=h-JG5SPxBQ0>, Dec. 2, 2016, 1 page.

Phone4u, "Iphone 4s Tips 'n' Tricks: Access the Camera from the Lock Screen—Phones 4u", Youtube, available at <https://www.youtube.com/watch?v=C8eDN4Vu2mg>, Dec. 9, 2011, 2 pages.

Plaisant et al., "Touchscreen Toggle Switches: Push or Slide? Design Issues and Usability Study", Technical Report CAR-TR-521, CS-TR-2557, Nov. 1990, pp. 1-10.

"Qpair", online available at: http://mongri.net/entry/G-Pad-83-0pair, Published on Dec. 20, 2013, 22 pages (10 pages of English Translation and 12 pages of Official copy).

"Q pair", Posting of a blog, Online Available at: <http://www.leaderyou.co.kr/2595>, Dec. 7, 2013, 24 pages (Official Copy Only) (See Communication under 37 CFR § 1.98(a) (3)).

"Real Solution of Two-step-authentication Password Management for Authentication Enhancement", Mar. 24, 2014, 11 pages (3 pages of English Translation and 8 pages of Official copy).

Riley et al., "Instruction, Feedback and Biometrics: the User Interface for Fingreprint Authentication System", Interact 2009, Part II, LNCS 5727, IFPI International Federation for Information Processing, 2009, pp. 293-305.

Search Report received for Netherlands Patent Application No. 2014737, dated Oct. 29, 2015, 9 pages.

Sensory Trulysecure, "Applock Face/voice Recognition", Available at <https://www.youtube.com/watch?v=odax5O51aT0>, May 27, 2015, 1 page.

Shankland, Stephen, "Chrome Os Gets 'ok Google' Voice Search Control", available online at <http://www.cnet.com/news/chrome-os-gets-ok-google-voice-search-control/>, May 21, 2014, 4 pages.

Smith, Eddie, "The Expert's Guide to Instapaper", available online at "http://www.macworld.com/article/1166898/the_experts_guide_to_instapaper.html", May 23, 2012, 8 pages.

Summons to Attend Oral Proceedings received for European Patent Application No. 04753978.8, dated Jul. 3, 2014, 8 pages.

Summons to Attend Oral Proceedings received for European Patent Application No. 08834386.8, dated Aug. 24, 2012, 4 pages.

Supplemental Notice of Allowance received for U.S. Appl. No. 12/207,370, dated Aug. 8, 2013, 2 pages.

Tanaka et al., "Innovative Mobile Device of Apple Finally Appeared, Mobile Phone + Ipod + Internet Terminal., Iphone", Mac Fan, vol. 15, No. 9, Japan, Mainichi Communications Inc, Sep. 1, 2007, pp. 4-13 (Official Copy only) (See Communication under 37 CFR § 1.98(a) (3)).

Thanakulmas, Thanit, "Mastercard Identity Check Facial Recognition Biometrics", Available at <https://www.youtube.com/watch?v=g4sMbrkt1gl>, Oct. 10, 2016, 1 page.

Third Party Observations received for European Patent Application No. 15168475.0, dated Jul. 19, 2016, 4 pages.

Videoreborn, "Motorola Atrix 4g: Wet Fingerprint Scanner Better Than Iphone 5s Finger Print Scanner!", Youtube, available at <https://www.youtube.com/watch?v=MSJIIG93MPg>, Mar. 16, 2011, 2 pages.

AUTHENTICATION WITH SECONDARY APPROVER

This application is a continuation of co-pending U.S. application. Ser. No. 14/642,366 filed Mar. 9, 2015, which is a continuation of U.S. application Ser. No. 13/248,872, filed on Sep. 29, 2011, now issued as U.S. Pat. No. 9,002,322.

BACKGROUND

The present disclosure relates generally to electronic devices, and more specifically to authentication of an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as cellular telephones, computers, tablets, and so forth, are commonly used in many industries, and in a wide range of applications. Such electronic devices may contain various information and functions, some of which may be confidential or restricted. Securing restricted content on an electronic device may involve a configuration in which nonrestricted content may be generally accessible while restricted content is generally inaccessible without authorization and/or authentication. To access such restricted content, a user may be authenticated for accessing restricted content when an electronic device or system verifies the user's identity (e.g., by entering a correct login key or passcode), or a user may be authorized to access restricted content when the device or system determines that the user has an appropriate access level for accessing or performing the restricted content.

Conventionally, to access restricted content on an electronic device requiring a login key, a user with knowledge of the login key may input the login key in an user interface of the electronic device, which generally requires the authorized user to physically interact with the device. Furthermore, a user who is not privileged with knowledge of the login key may sometimes need to access restricted content on a device, and may typically need further authorization before proceeding to access the restricted content. For example, a retail system may include several electronic devices, each including information or functions which have access restrictions based on the access levels of the employees using the devices. An employee may sometimes need to access restricted content that the employee does not have access to, and in such instances, manager authorization may be required before the restricted content may be accessed by the employee. However, the process of authorizing an employee's access on the employee's device may be inefficient.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for obtaining secondary authorization wirelessly. For example, a first device may contain restricted content that cannot be access without authorization from a second device. The present techniques allow the first device to send an authorization request signal to the second device, and allow the second device to give or deny authorization to the first device by sending an authorization signal.

In some embodiments, the first device may be a retail transaction or information device used by an employee, and the second device may be a similar or different device used by a manager. Thus, the employee may obtain access to restricted content their device wirelessly from the manager's device, so long as the manager give the employee access from the manager's device Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development ninny such actual implementation, as in any engineering or design project, numerous implementation-specific decisions must be made to achieve the developers' specific goals, such as compliance, with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques involve a secondary authorization techniques where a requesting device (also referred to as a first device) in a system may wirelessly request and receive authorization to access restricted content on the first device from an authorizing device (also referred to as a second device) in the system. Embodiments of the present techniques may be applied in a retail system involving a network of electronic devices each having various functions, where the various functions may have one or more access levels. For example, certain functions (e.g., accepting payment, accessing purchase history, etc.) may have a first access level and may be generally unrestricted to a user of the retail system (e.g., an employee) having the first access level. However, other functions (e.g., accepting merchandise return, giving a discount, or overriding a warranty, etc.) may have a second access level and may be restricted without authorization from a user (e.g., from a manager) having the second access level.

Conventionally, a manager may input an authorization key or login on the same device used by the employee before the employee may perform a restricted function. In accordance with embodiments of the present techniques, an employee using a first device may wirelessly request and receive approval from a manager using a second device to perform otherwise restricted functions on the first device.

In some embodiments, an authorizing device may be able to give authorization to multiple requesting devices. Relating to the retail application previously mentioned, a manager may use one authorizing device to give authorization to multiple requesting devices from which employees may access restricted content. As may be common in retail settings, each employee may be using a different first device located in different places throughout a retail setting. In some embodiments, the manager may not need to travel to the location of each employee requiring access to restricted content. Rather, the manager may provide authorization to each employee's devices wirelessly and without physically traveling to each employee's respective location.

Figure 1:
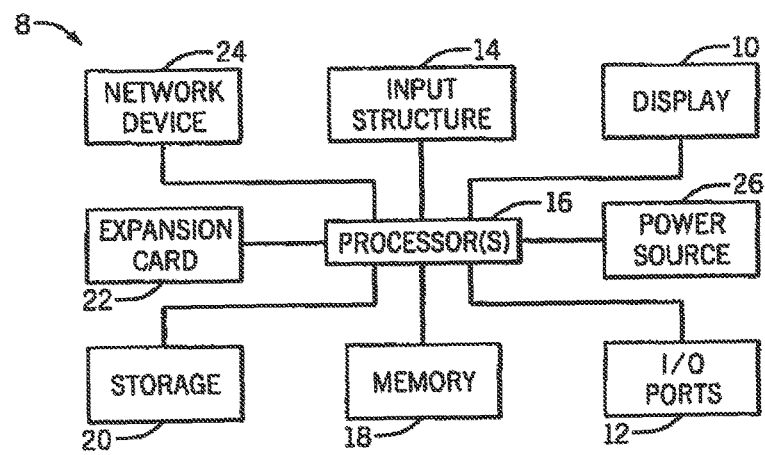
FIG. 1 is a block diagram of components of an electronic device, in accordance with aspects of the present disclosure.
Figure 3:
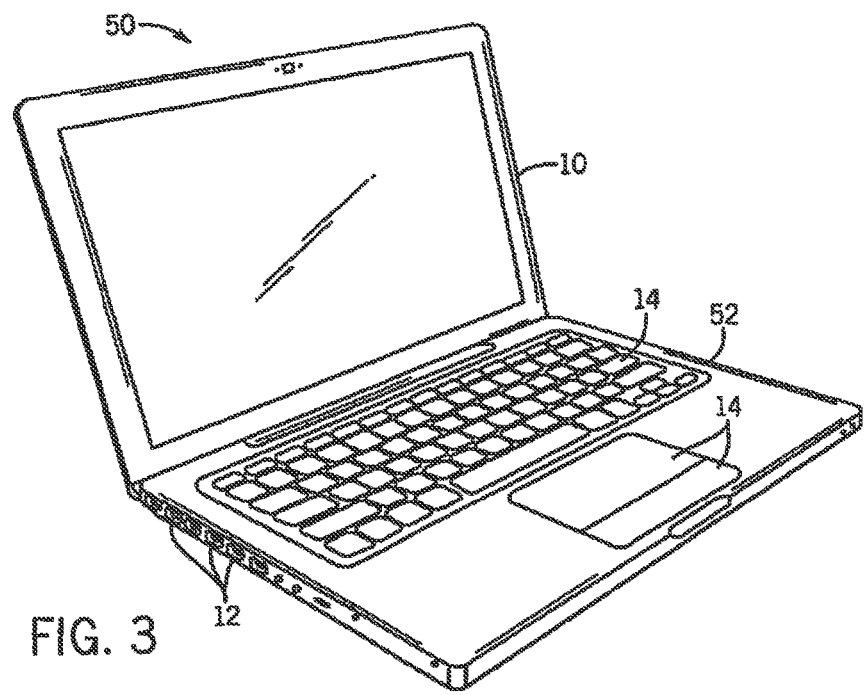
FIG. 3 is a view of a computer for use in accordance with aspects of the present disclosure.
Figure 2:
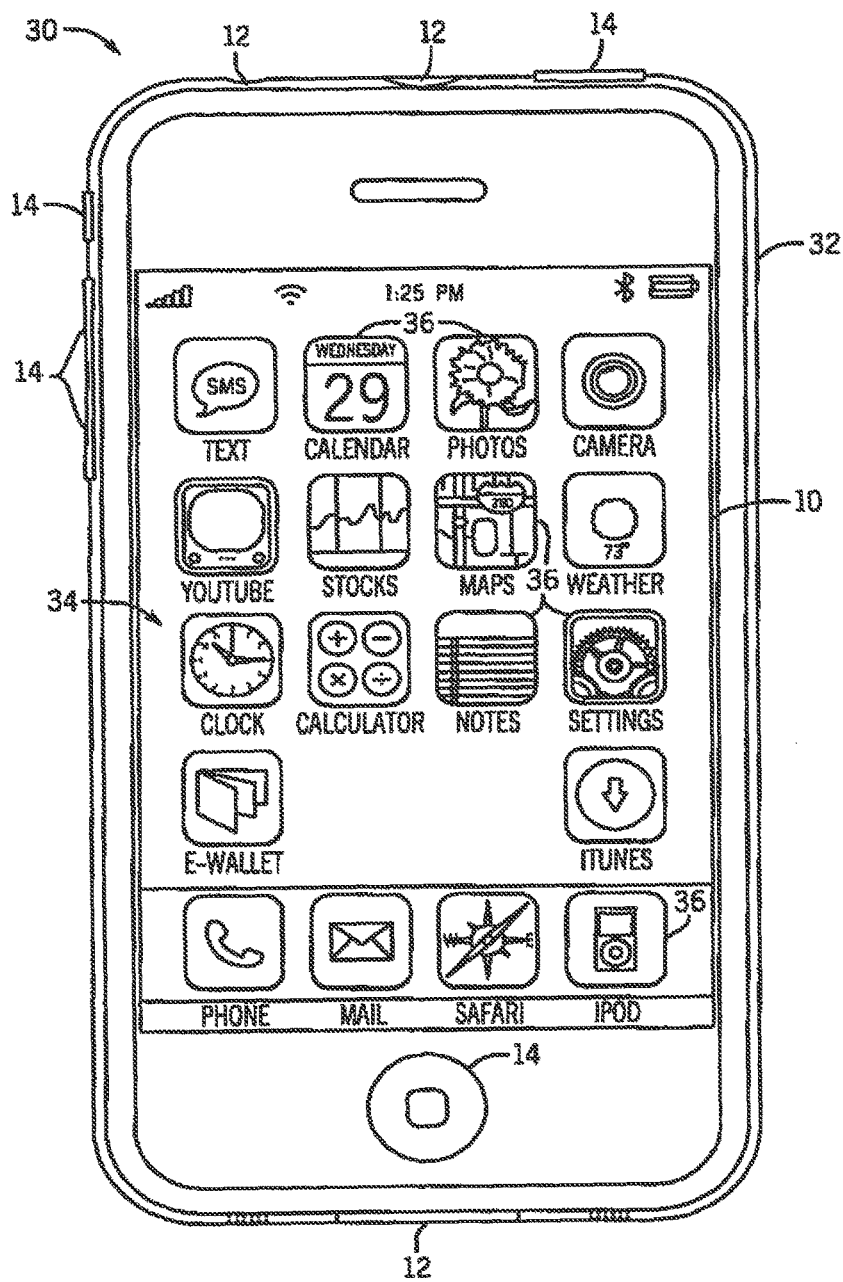
FIG. 2 is a front view of a handheld electronic device in accordance with aspects of the present disclosure.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. Such electronic devices, as well as other electronic devices providing suitable storage and/or processing capabilities, may be used in conjunction with the present techniques. Furthermore, suitable electronic devices may have wireless communication capabilities and may be able to wirelessly communicate with other electronic devices to perform the secondary authorization techniques of the present disclosure.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, data processing circuitry, such as one or more processors 16, a memory device 18, a non-volatile storage 20, expansion card(s) 22, a networking device 24, and a power source 26.

With regard to each of these components, the display 10 may be used to display various images generated by the device 8. The display 10 may be any type of display such as a cathode ray tube (CRT), a liquid crystal display (LCD), a light emitting diode (LED) display, an organic light emitting diode (OLED) display, or other suitable display. In certain embodiments of the electronic device 8, the display 10 may include a touch-sensitive element, such as a touch screen.

The I/O ports 12 may include ports configured to connect to a variety of external devices, such as a power source or other electronic devices (such as handheld devices and/or computers, printers, projectors, external displays, modems, docking stations, and so forth). For example, in some embodiments, peripheral hardware attachments such as a credit card reader, commonly referred to as a card sled, may be connected to the device 8 through I/O ports 12. In some embodiments, information obtained through the credit card reader may be transmitted to a suitable processor (e.g., processor 16). The I/O ports 12 may support any standard or proprietary interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which input or feedback is provided to data processing circuitry, such as the processor 16. Such input structures 14 may be configured to control a function of the device 8 when actuated. For example, the input structures 14 may include buttons, sliders, switches, control pads, keys, knobs, scroll wheels, keyboards, mice, touchpads, and so forth. In certain embodiments, the input structures 14 may also include such components as global positioning system (GPS) circuitry and/or accelerometers that convey information about the location and/or orientation of the device 8 to the processors 16.

In certain embodiments, an input structure 14 and display 10 may be provided together, such an in the case of a touch screen where a touch sensitive mechanism is provided in conjunction with the display 10. In such embodiments, the user may select or interact with displayed interface elements via the touch sensitive mechanism. In this way, the displayed user interface may provide interactive functionality, allowing a user to select, by touch screen or other input structure, from among options displayed on the display 10.

User interaction with the input structures 14, such as to interact with a user or application interface displayed on the display 10, may generate electrical signals indicative of the user input. These input signals may be routed via suitable pathways, such as an input hub or bus, to data processing circuitry, such as the processor(s) 16, for further processing.

The processor(s) 16 may provide data processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a memory 18. The memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware executed by a processor 16 (such as basic input/output instructions or operating system instructions, including instructions implementing non-alphanumeric authentication (e.g., authentication not based on keys or characters found on a keyboard) as discussed herein), other programs that enable various functions of the electronic device 8, user interface functions, processor functions. In addition, the memory 18 may be used for buffering or caching during operation of the electronic device 8.

The components may further include a non-volatile storage 20 for persistent storage of data and/or instructions. The non-volatile storage 20 may include flash memory, a hard drive, or any other optical, magnetic, and/or solid-state storage media. The non-volatile storage 20 may be used to store data files such as personal or business information (e.g., financial and other account information), software, wireless connection information (e.g., information that may enable the electronic device 8 to establish a wireless connection, such as a telephone or wireless network connection), and any other suitable data. In addition, the non-volatile storage 20 may also store code and/or data for implementing various functions of the electronic device 8, such as application or program code, data associated with such applications or programs, operating system code, user configured preferences, as well as code for implementing secure user authentication as discussed herein.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable standard or proprietary connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), cellular network, or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone, which may be used as a first device and/or a second device. It should be noted that while the depicted handheld device 30 is provided in the context of a cellular telephone, other types of handheld devices (such as media players for playing musk and/or video, personal data organizers, handheld game platforms, and/or combinations of such devices) may also be suitable be provided as the electronic device 8. Further, a suitable handheld device 30 may incorporate the functionality done or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the generalized electronic device of FIG. 1, the handheld device 30 may allow a user to connect to and communicate through the Internet or through other networks, such as local or wide area networks or cellular networks. For example, the handheld device 30 may allow a user to communicate using e-mail, text messaging, instant messaging, or other forms of electronic communication. The handheld electronic device 30, may also communicate with other devices using short-range connections, such as Bluetooth and near field communication. By way of example, the handheld device 30 may be a model of an iPod® or iPhone®, or a derivative thereof, available from Apple Inc. of Cupertino, Calif. The handheld electronic device 30 may also be in the form of a tablet computer. By way of example, the tablet computer may be a model of an iPad®, or a derivative thereof, available from Apple Inc. of Cupertino, Calif.

In the depicted embodiment, a housing 32 includes input structures 14 through which a user may interface with the device. Each input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

A display 10 of the handheld device 30 may be used to display a graphical user interface (GUI) 34 that allows a user to interact with the handheld device 30. The GUI 34 may include various layers, windows, screens, templates, or other graphical elements that may be displayed in all, or a portion, of the display 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 10 in certain embodiments, or may be selected by a user input structure 14, such as a wheel or button.

In addition to handheld devices 30, such as the depicted cellular telephone of FIG. 2, an electronic device 8 may also take the form of a computer or other types of electronic device on which confidential information might be stored and on which software code governing secure access to such information might be executed. Such computers may include computers that are generally portable (such as laptop, notebook, and tablet computers) as well as computers that are generally used in one place (such as conventional desktop computers, workstations and/or servers). In certain embodiments, the electronic device 8 in the form of computer may be a model of a MacBook®, MacBook® Pro, MacBook Air®, iMac®, Mac® mini, or Mac Pro® available from Apple Inc.

By way of example, an electronic device 8 in the form of a laptop computer 50 is illustrated in FIG. 3 in accordance with one embodiment. The depicted computer 50 includes a housing 52, a display 10, input structures 14, and input/output ports 12. The input structures 14 (such as a keyboard and/or a touchpad) may be used to interact with the computer 50, such as to start, control, or operate a GUI or applications running on the computer 50. For example, a keyboard and/or touchpad may allow a user to navigate a user interface or application interface displayed on the display 10. In addition, the input and output ports 12 may allow connection of additional devices. For example, the computer 50 may include an I/O port 12, such as a USB port or other port, suitable for connecting to another electronic device, such as a handheld electronic device 30.

In addition, as discussed with respect to the handheld device 30, the computer 50 may include data processing circuitry (such as one or more processors), network connectivity, memory, and storage capabilities that allow the computer 50 to store and execute a GUI and other applications suitable for implementing the present techniques. For example, the computer 50 may be capable of storing and executing programming code encoding routines suitable for accessing confidential information or secured applications or network connections using non-alphanumeric and non-biometric inputs (e.g., gestures, sequences, and so forth). Further, to the extent that a computer 50 has network connectivity, such connectivity may be utilized to update or modify an existing application on the computer 50 to provide such functionality.

Figure 4:
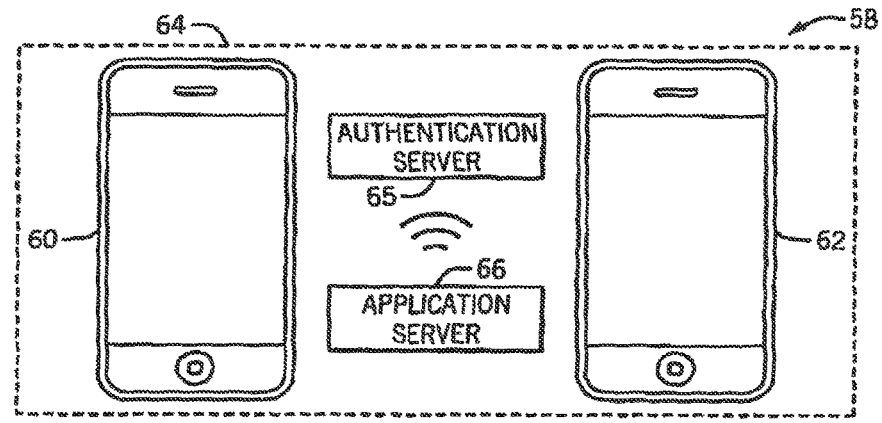
FIG. 4 is a representation of a secondary authorization system, in accordance with the present disclosure.

With the foregoing discussion in mind, it may be appreciated that the electronic device 8 may be suitable for the secondary authorization techniques presented in this disclosure. FIG. 4 illustrates a secondary authorization system 58, which includes a first device 60, a second device 62, a wireless network 64, an authentication server 65, and an application server 66. In some embodiments, the first device 60 and/or the second device may be a handheld device 30 (FIG. 2), a laptop computer 60 (FIG. 3), or any other suitable electronic device 8.

The first device 60 may include various content and functionality, some of which may have different access restrictions. The first device 60 may be used by a user with limited authority, henceforth known as a limited authority user. The first device 60 generally includes common content, which may include information or functions that are accessible by the limited authority user without further authorization. In some embodiments, the first device 60 may request an initial login by the limited authority user before the common content may be accessed. For example, the first device 60 may be configured to be able to perform tasks such as completing a purchase transaction without additional authorization, as a purchase transaction may be an example of common content. However, the first device 60 may not be able to perform a merchandise return transaction (i.e., transferring money onto a credit card), as a return transaction may be an example of restricted content. In some embodiments, the first device 60 may transmit a secondary authorization request signal to the second device 62 via a wireless network 64 to request authorization.

The second device 62 may generally be used by a user having a higher level of authority, henceforth known as full authority user, and may have the authority to access restricted content, as well as give authorization to a limited authority user to access the restricted content. The second device 62 may receive the secondary authorization request, and a full authority user operating the second device 62 may select to authorize the restricted content corresponding to the received secondary authorization request. To indicate authorization to the first device 60, the second device 62 may transmit an authorization signal to the first device 60, and the restricted content may then be accessible from the first device 60.

The first device 60 and the second device 62 may communicate with each other and other devices via the wireless network 64. The wireless network 64 may be a personal area network (PAN) such as a Bluetooth™ network, a local area network (LAN) such as an 802.11 Wi-Fi network, a wide area network (WAN) such as a 3G or 4G cellular network, and other suitable wireless networks.

The authentication server 65 in the wireless network 64 may include account data and/or identity data associated with accounts associated with the secondary authorization system 58. For example, account information for each employee of the system 58 may be stored in the authentication server 65. In some embodiments, the authentication server 65 may include processing or control elements suitable for verifying a user's account, referred to as authenticating a user. For example, the authentication server 65 may compare a user authentication input (e.g., an identifying password, gesture, account name, etc.) with account data stored in an account database in the authentication server 65.

In some embodiments, the secondary authorization system 58 may also include an application server 66 connected in the wireless network 64. The application server 66 may be configured to proxy between the first device 60 and the second device 62. The application server 66 may verify any authentication inputs by accessing the authentication server 65. If authentication is verified at the authentication server 65, the application server may be configured to transmit an authorization signal to the first device 60, and the restricted content may then be accessible from the first device 60. In some embodiments, the application server 66 may also verify an authority level of an authenticated user for performing a function, accessing content, or authorizing access to content or functions. In some embodiments, processing components or data associated with authentication and authorization may be stored in the second device 62.

Figure 5:
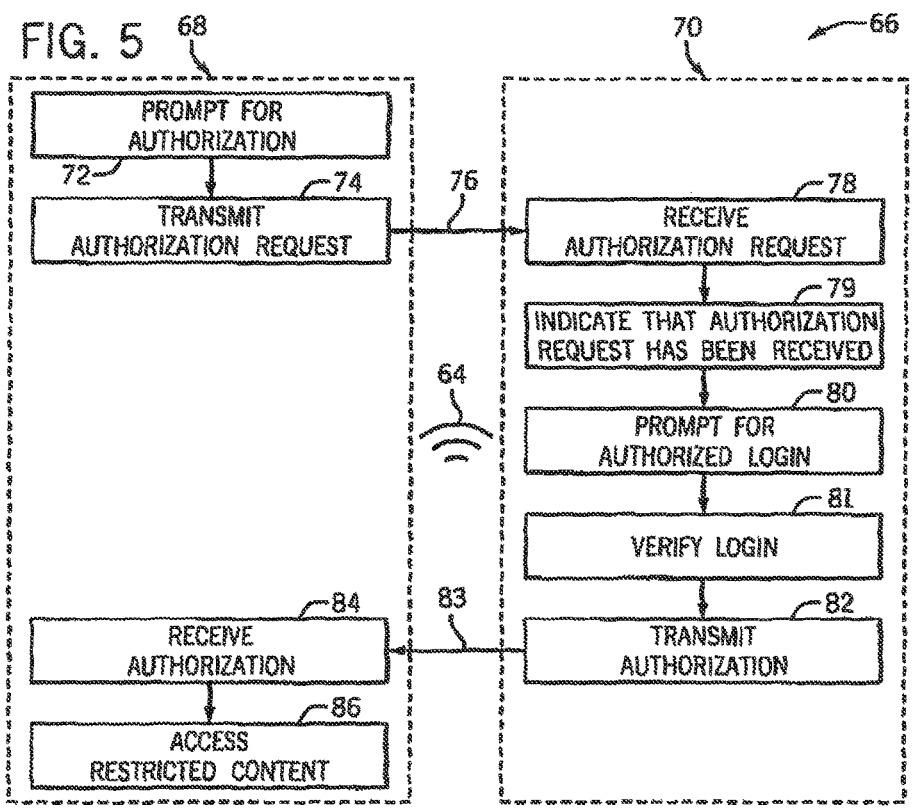
FIG. 5 is a flowchart depicting a process of authorizing content on a first device from a second device, in accordance with the present disclosure.

FIG. 5 is a flowchart representing a secondary authorization process 66. FIGS. 6-10 are a series of exemplary screenshots which illustrate the first and second devices at various points in the secondary authorization process 66. As FIGS. 6-10 represent screens displayed during the process illustrated in FIGS. 5 and 6-10 will be discussed concurrently.

Figure 6:
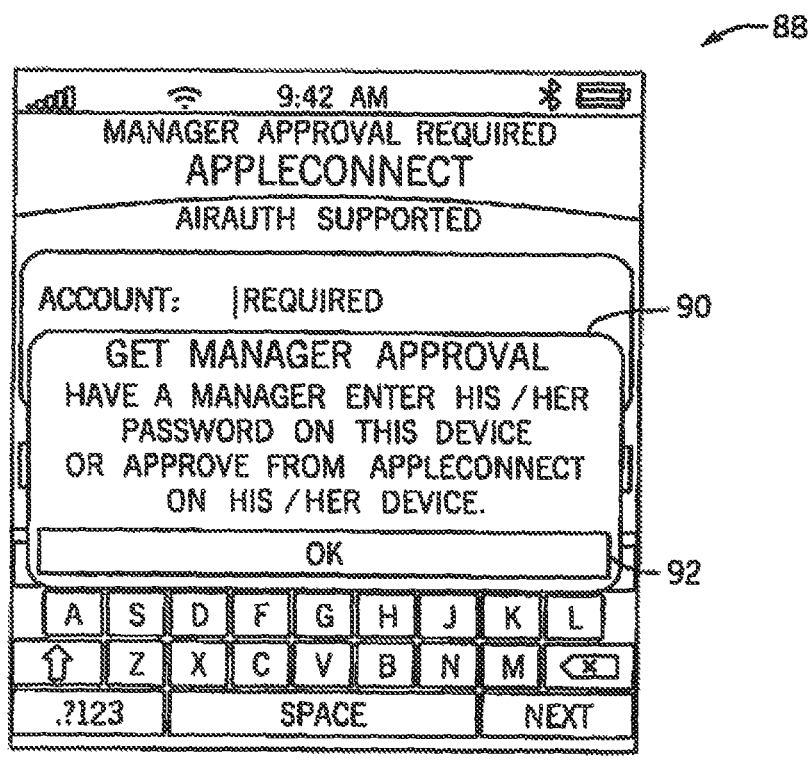
FIG. 6 is an illustration of a screen of an electronic device indicating that authorization is required to access content on the device, in accordance with the present disclosure.

As illustrated in FIG. 5, the secondary authorization process 66 is categorized into first device actions 68 and second device actions 70. The process 66 of obtaining secondary authorization is initiated when the first device 60 prompts (block 72) for authorization. FIG. 6 is an illustration of a screen on the first device 60 when the first device 60 prompts for authorization. An authorization prompt 90 may be displayed on the screen 88. In some embodiments, the authorization prompt 90 may include an accept button 92. Activating the accept button 92 may indicate that the limited authority user is aware that authorization is required to proceed with accessing the desired restricted content. In some embodiments, activating the accept button 92 the first device 60 may initiate a request for authorization, and in other devices, the first device 60 may display an additional screen for confirming the transmission of an authorization request signal. In different embodiments, "activating" a button may be done by a number of actions, such as pressing, pushing, selecting, touching, and so forth, depending on the configuration of the devices 60 and 62.

In some embodiments, upon initiation of an authorization request (e.g., in response to activation of the accept button 92), the first device 60 may display an input screen 94 (FIG. 7A), in which entry of a correct input on the first device 60 may authorize the restricted content on the first device 60. For example, a full authority user may enter an input directly on the first device 60 to give authorization to the restricted content from the first device 60. In some embodiments, the first device 60 may request an authorizing input directly into the first device 60 when secondary authorization techniques are not available. For instance, the first device 60 may display an input screen 94 if a suitable wireless connection 64 between the first device 60 and the second device 62 is not detected.

Figure 7A:
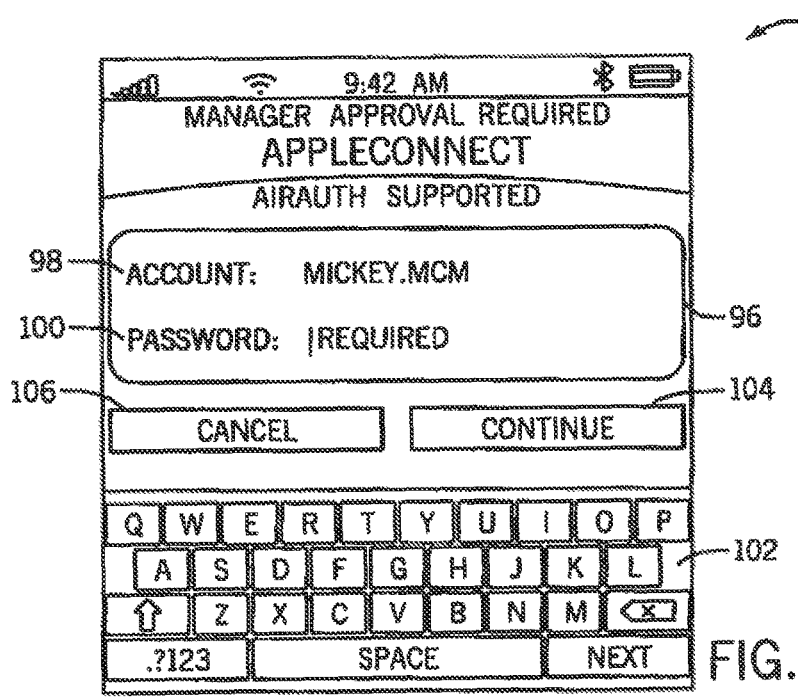
FIGS. 7A-7B are illustrations of two exemplary screens of the electronic device in FIG. 6 indicating that a request for authorization has been transmitted to another device in the secondary authorization system, in accordance with the present disclosure.
Figure 7B:
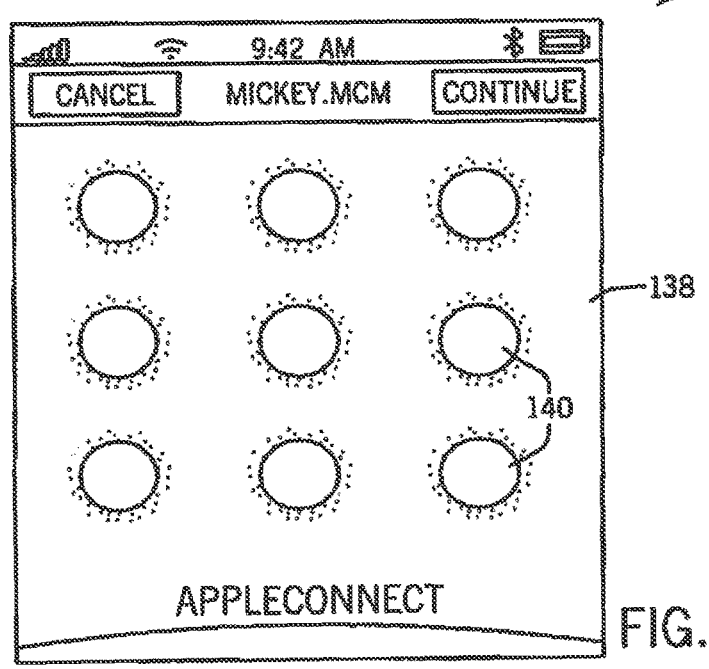

In some embodiments, a prompt 96 on the input screen 94 includes an account data field 98 and a password data field 100. Information generally related to the identity of the user may be entered into the account data field 98, and information generally related to a secure password may be entered into the password data field 100. In some embodiments, a user may use a keypad 102 to enter information in the account data field 98 and password data field 100. After the login information is entered, a continue button 104 may be selected, and the first device 60 may verify the entered information. A cancel button 106 may also be displayed, and selection of this button 106 may cancel the authorization request and return the first device 60 to a previous page. Correct entries in the account data field 98 and in the password data field 100 may result in the authentication of a user having full authorization (and authority to authorize others) on the first device 60, thereby authorizing access to the restricted content which initiated the authorization request Additionally, as illustrated in FIG. 7B, one or more embodiments include authenticating a full authority user on the first device 60 through a gesture login screen 136 on the first device. The gesture login 136 includes a gesture node arrangement 138 including multiple gesture nodes 140. The identity of the user may be verified when the user touches or swipes across the gesture nodes 140 in a predetermined fashion. The correct pattern or path in which the gesture nodes 140 are selected is a cryptographic key corresponding to an authorized user, such that correctly touching the gesture map 138 allows the first device 60 to verify the identity and authorization level of the user. In some embodiments, a user may select between either the input screen 94 or the gesture login screen 136 for authentication on the first device 60.

Figure 8:
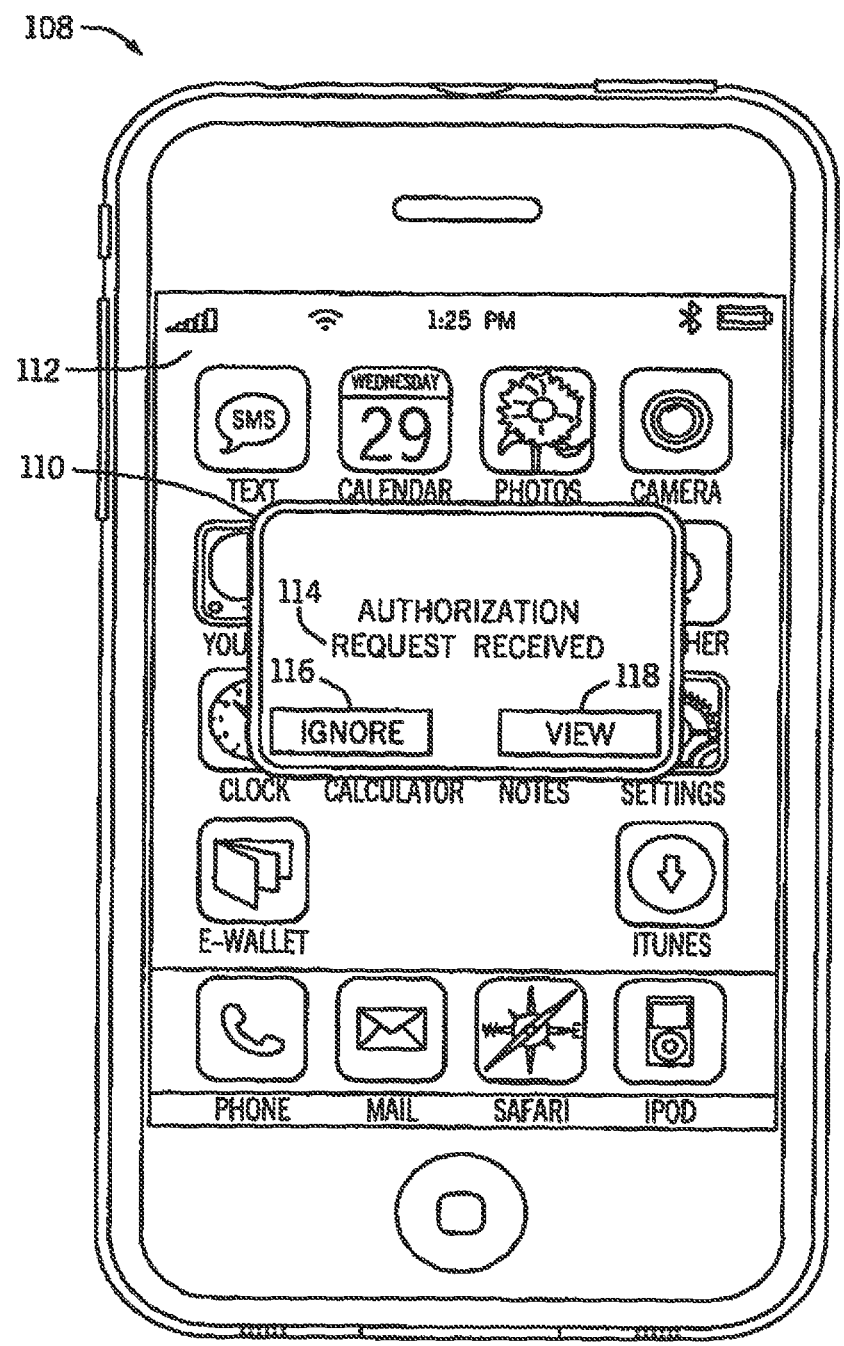
FIG. 8 is an illustration of a screen of a second device indicating that an authorization request is received, in accordance with the present disclosure.

Alternatively, in addition to authorization through the first device 60, the present techniques include requesting and receiving authorization wirelessly, and from a different device (e.g., the second device 62). Referring back to FIG. 5, to initiate a secondary authorization process 66, the first device 60 may transmit (block 74) the authorization request signal 76 wirelessly in a wireless network 64. In some embodiments, the authorization request signal 76 may go through an application server 66 (FIG. 4) and undergo some processing before it reaches the second device 62. The second device 62 may receive (block 78) the authorization request signal 76 and indicate (block 79) that the authorization request 76 is received on the second device 62. FIG. 8 is an illustration of a screen 112 indicating that a secondary authorization request 76 has been received at the second device 62. In the illustrated embodiment, when a secondary authorization request 76 is received (block 78), an authorization request notification 110 may appear on a screen 112 of the second device 62. As illustrated, the authorization request notification 110 may include a message 114, an ignore button 116, and/or a view button 118. The message 114 may include content related to the authorization request signal 76, such as information regarding the particular sender, time, and other related details. Selection of the ignore button 116 may return the second device 62 to its previous content or function, and selection of the view button 118 may result in the second device 62 prompting (block 80) for authentication and/or authorization.

Figure 9:
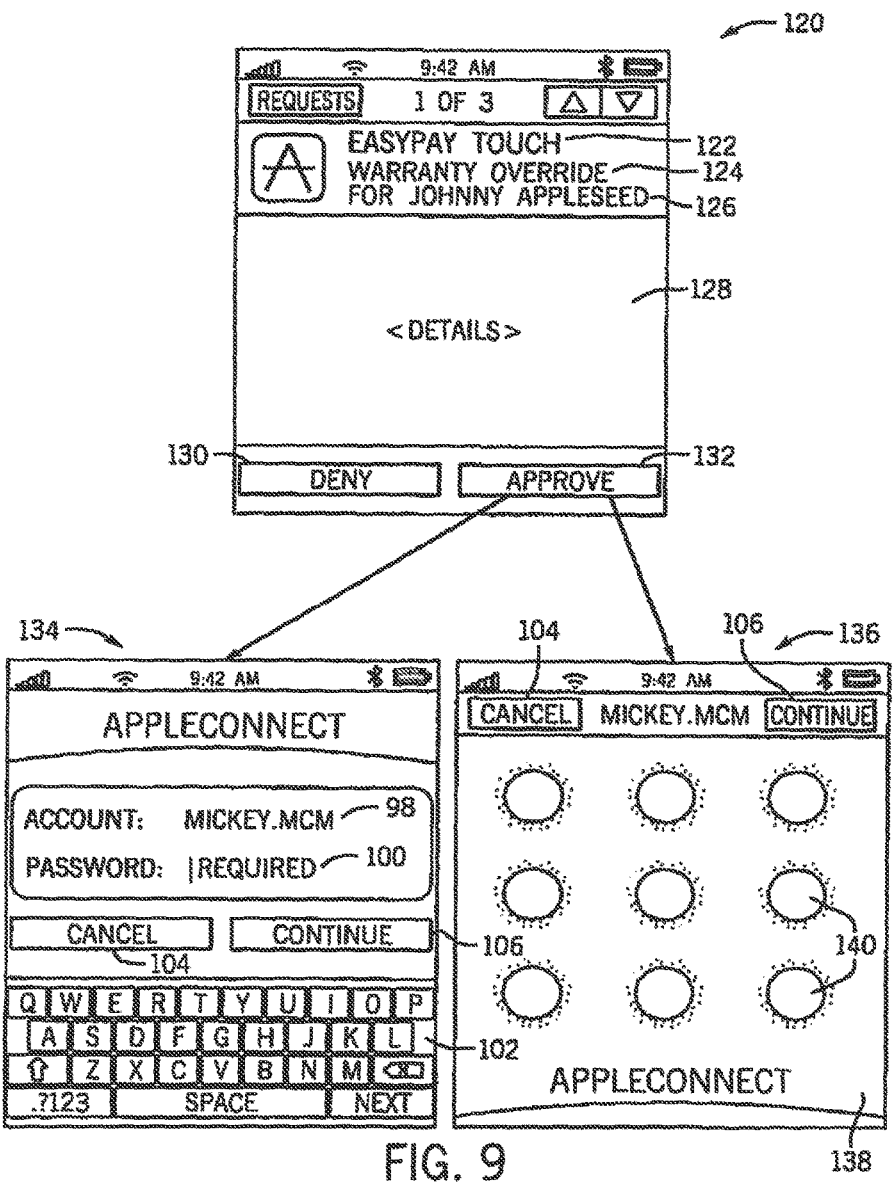
FIG. 9 is an illustration of a progression of multiple screens on a second device during authorization of an authorization request, in accordance with the present disclosure.

FIG. 9 is an illustration of a progression of screens which may be displayed on the second device 62 involved in prompting (block 80) for authentication and/or authorization in response to an authorization request 76. As illustrated in FIG. 9, in some embodiments, the second device 62 may display an authorization request details screen 120, a password login screen 134, and a gesture login screen 136. In the present embodiment, the authorization request details screen 120 may be displayed after the authorized user activates the view button 118 corresponding to the authorization request notification 110 (FIG. 8). As illustrated in the present embodiment, the authorization request details screen 120 may include information relating to the details of the authorization request 76, such as an application name 122, an application function 124, and a requester name 126. The application name 122 may indicate the application, program, and/or network through which the authorization request 76 is received. The application function 124 may generally refer to a specific function or content that the first device 60 is requesting to access. The requester name 126 may identify the limited authorization user operating the first device 60 and/or requesting the authorization.

In the present embodiment, the authorization request details screen 120 may also includes a details window 128, which may show any additional information regarding the authorization request such as the time, location, priority level, and so forth. The details window 128 may also contain other details or instructions regarding the authorization request. For example, a user of the first device 60 may input additional details or questions along with the authorization request. The authorization request details page 120 may also include a deny button 130 and an approve button 132. A selection of the deny button 150 may deny the authorization request, and a selection of the approve button 132 may approve the authorization request. In some embodiments, once the approve button 132 is selected, the second device 62 may request authentication to verify the identity of the current user of the second device 60. Successful authentication may also result in authorization in response to the authorization request if the authenticated user indeed has authorization to grant authorization to the authorization request.

Two embodiments for authenticating a full authority user on the second device 62 are represented in FIG. 9. Similar to the input screen 94 and gesture screen 136 discussed with respect to FIGS. 7A and 7B, authentication on the second device 62 may also involve an input screen 134 and a gesture screen 136. In one embodiment, the input screen 134, includes an account data field 98 and a password data field 100. Information generally related to the identity of the user, may be entered in the account data field 98, and a password may be entered in the password data field 100. The screen 134 may also include a cancel button 104 and a continue button 106. Selection of the cancel button 104 may exit the secondary authorization process. The continue button 106 may become active after the user enters information in the account data field 98 and the password data field 100. If the continue button 106 is selected, the second device 62 may analyze the entered information to determine whether the entries made in the account data field 98 and the password data field 100 correspond to an account having, authorization to authorize access to the restricted content on the first device 60. In the present embodiments, a user may use a keypad 102 to input account data and password data.

In some embodiments, a second device 62 may also authenticate a user on a gesture login page 136. The gesture login page 136 may include a gesture node arrangement 138 having multiple gesture nodes 140. Generally, a user may contact the gesture nodes in a path or pattern which may be compared to a previously stored path or pattern for authentication of a user on the second device 62. As a full authority user may have a unique path of pattern in interfacing with the gesture map, correctly touching the nodes 140 and/or gesture login 138 on gesture login page 136 may authenticate the identity of the full authority user, and thereby grant authorization to the authorization request from the second device 62. The screen 136 may also include a cancel button 104 and a continue button 106, where selecting the cancel button 104 may exit the secondary authorization process on the second device 62, and selecting the continue button 106 may prompt the second device 62 to verify the entered gesture.

In some embodiments, in order to obtain authentication, the second device 62 may transmit the authentication input data, such as the password input or gesture input data to the authentication server 65, where it is generally authenticated by comparing the authentication input to a database of stored authentication keys. The authentication server 65 may match the authentication input with stored authentication keys in an account database in the authentication server 65 to authenticate the second device 64.

In some embodiments, the second device 62 may not prompt (block 80) for authentication before transmitting authorization to the first device 60. For example, in some embodiments, the second device 62 may transmit (block 82) an authorization signal 83 in response to simply selecting an approve button (e.g., the approve button 132). In some embodiments, the second device 62 may require authentication of the full authority user when initially activating the second device 62 before the second device 62 can authorize secondary authorization requests. As such, the full authority user may not need to be authenticated to authorize each secondary authorization request.

Once approval is selected on the second device 62 and/or once the second device 62 authenticates a full authority user, the second device 62 may transmit (block 82) an authorization signal 83 to the first device 60 via the wireless connection 64. The first 60 device may then receive (block 84) the authorization signal 83. In response to receiving (block 84) the authorization signal 83, the first device 60 may access (block 84) the restricted content.

In some embodiments, the authorization signal 83 may be transmitted by the second device 62 to the first device 60 through the application server 66. For example, after authentication on the authentication server 65, the application server 66 may transmit the authorization signal 83 to the first device 60. In some embodiments, the application server 66 may receive the authentication input data from the second device 62 and relay the data to the authentication server 65 for authentication. Other non-authorization related communication between the first device 60 and the second device 62 may also be supported by the application server 66. Furthermore, the application server 66 may also continue to monitor and/or record use of the restricted content on the first device 60 after the first device 60 accesses the restricted content. It should be noted that while the present disclosure refers to transmissions of the authorization request, authentication input, and the authorization signal between the first device 60 and the second device 64, any or all of these transmissions may pass through the authentication server 65 and/or the application server 66 in the wireless network 64.

In one or more embodiments, when a first device 60 receives authorization and is able to access the restricted content, the first device 60 may have access to the restricted content for a limited amount of time, and/or for the duration of a function. Furthermore, the first device 60 may have access only to the specific content or function for which it has requested and received authorization.

Figure 10:
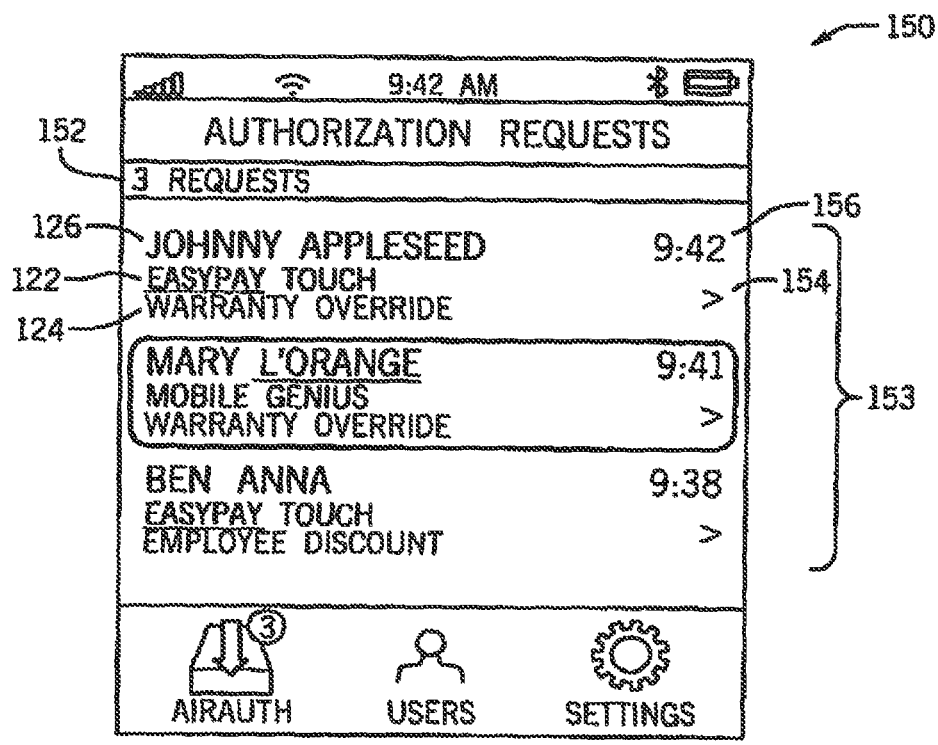
FIG. 10 is an illustration of a screen of a second device having a queue of authorization requests, in accordance with the present disclosure.

In some embodiments, the second device 62 may receive secondary authorization requests from more than one device. FIG. 10 is an illustration of an authorization request queue screen 150 which may be displayed by the second device 62 in some embodiments. The authorization request queue screen 150 may indicate a number 152 of total requests, and include a queue 153 of one or more authorization requests 154. In the present embodiment, each authorization request 154 may further include details corresponding to each request in the queue 153, such as a requester name 126, an application name 122, an application function 124, and a time of request 156. As illustrated in FIG. 10, authorization requests may be received from different requesters, who may be limited authority users each using different devices. In some embodiments, the full authority user using the second device 62 may select an authorization request from the queue 153 to view and approve or deny. In some embodiments, an authorization request may be selected from the queue 153 regardless of order in which it appears in the queue 153.

In one or more embodiments, a requesting device may send additional authorization requests to more than one authorizing device. For example, when making an authorization request, the first device 60 may be able to determine, via the wireless network, which authorizing devices are active (e.g., in operation and/or accepting secondary authorization requests). The requesting device may be configured to send an authorization request to all active authorizing devices. The requesting device may also be configured to automatically send the authorization request to a specific authorizing device, chosen based on various detectable parameters, such being closest in distance, having the shortest authorization request queue, and so forth. The requesting device may also be configured to allow the user of the requesting device to select the authorizing device(s) to send the secondary authorization request. For example, a requesting device may display the identity of specific authorized users operating the authorizing devices and allow the selection of a particular authorized user and/or authorizing device for sending the secondary authorization request signal.

In one or more embodiments, the requesting device may also be configured to send a message to an authorizing device or advising the authorized user to go to the location of the requesting device and limited authority user. The authorizing device may be configured to indicate the physical location of the requesting device to the full authority user so that the full authority user may be able to find the limited authority user (e.g., in the location of a retail store). For instance, lithe limited authority user has a more complex problem that cannot be effectively solved by simply sending a secondary authorization request, more in-depth assistance may be requested using the secondary authorization techniques.

Furthermore, one or more embodiments may include an automatic approval for certain authorization requests, where an approving device may automatically approve requests without additional action from the full authority user. For example, the second device may automatically approve certain secondary authorization requests or requests received by certain requesting devices. Accordingly, such decisions regarding automated approving of authorization requests may also be stored and/or processed on the application server 66.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system comprising:
a first device logged into a first user account and configured to request authorization to perform a restricted activity on the first device by transmitting a request signal through a network before performing the restricted activity, receive an authorizing signal through the network, and perform the restricted activity in response to receiving the authorizing signal, wherein the restricted activity includes accessing restricted content; and
a second device logged into a second user account and configured to receive the request signal from the first device through the network, display an authentication input for authenticating an authorized user associated with the second user account, display an authorization input for authorizing the restricted activity on the first device, and transmit the authorizing signal through the network if the second device is authenticated and if the first device is authorized, wherein content on the first device that is common to the first user account and the second user account is not restricted content.

2. The system of claim 1, wherein the authorization input comprises a text input, a gesture input, or an option between the text input and the gesture input.

3. The system of claim 1, wherein the first device is configured to transmit the request signal to a plurality of second devices.

4. The system of claim 1, wherein the second device is configured to receive request signals from, and send authorizing signals to, a plurality of first devices.

5. The system of claim 1, wherein the second device is configured to receive the authentication input to authenticate the authorized user for a session, and the second device is configured to transmit the authorizing signal to the first device when the first device is authorized without additionally authenticating the authorized user on the second device during the session.

6. The system of claim 1, wherein the first user account has limited authority to access the restricted content and the second user account has full authority to access the restricted content.

7. A method comprising:
receiving, by a device associated with a first user account, request to access content on the device; and
when the content is restricted for the first user account, requesting authorization, from a second user account, to access the restricted content on the device,
wherein content that is common to the first user account and the second user account is not restricted.

8. The method of claim 7 further comprising:
receiving, by the device, an authorization signal to access the restricted content.

9. The method of claim 7, wherein the authorization is requested from a plurality of user accounts having full authority.

10. The method of claim 7, wherein the first user account has limited authority to access the restricted content and the second user account has full authority to access the restricted content.

11. A method comprising:
receiving, by a device, a request for authorization to access restricted content on the device by a first user account logged into the device; and
determining, through a second user account logged into the device, whether to authorize the access to the restricted content on the device by the first user account.

12. The method of claim 11 further comprising:
receiving, by the device, authorization input that authorizes the access; and
transmitting, by the device, an authorization signal in response to receiving the authorization input.

13. The method of claim 12, wherein the authorization input comprises a text input, a gesture input, or an option between the text input and the gesture input.

14. The method of claim 11 further comprising:
receiving, by the device, authentication input to authenticate the user account having full authority.

15. The method of claim 11, wherein the first user account has limited authority to access the restricted content and the second user account has full authority to access the restricted content.

16. A non-transitory computer-readable storage medium having executable instructions to cause a processor on a device to perform operations comprising:

receiving a request from a first user account to access content on a device; and when the content is restricted for the first user account, requesting authorization, from a second user account, to access the restricted content on the device by the first user account, wherein content that is common to the first user account and the second user account is not restricted.

17. The non-transitory computer-readable storage medium of claim 16, wherein the operations further comprise:

receiving an authorization signal to access the content that is restricted.

18. The non-transitory computer-readable storage medium of claim 16, wherein the operations further comprise:

requesting authorization from a plurality of user accounts having full authority.

19. The non-transitory computer-readable storage medium of claim 16, wherein the first user account has limited authority to access the restricted content and the second user account has full authority to access the restricted content.

20. A non-transitory computer-readable storage medium having executable instructions to cause a processor on a device to perform operations comprising:

receiving a request for authorization to access restricted content on a device by a user account logged into the device; and determining, through a second user account logged into the device, whether to authorize the access to the restricted content on the device by the first user account, wherein content that is common to the first user account and the second user account is not restricted.

21. The non-transitory computer-readable storage medium of claim 20, wherein the operations further comprise:

receiving authorization input that authorizes the access; and transmitting an authorization signal in response to receiving the authorization input.

22. The non-transitory computer-readable storage medium of claim 21, wherein the authorization input comprises a text input, a gesture input, or an option between the text input and the gesture input.

23. The non-transitory computer-readable storage medium of claim 20, wherein the operations further comprise:

receiving authentication input to authenticate the user account having full authority.

24. The non-transitory computer-readable storage medium of claim 20, wherein the first user account has limited authority to access the restricted content and the second user account has full authority to access the restricted content.

25. A device comprising:

one or more processors;

a network interface coupled to the one or more processors through the bus; and a memory coupled to the one or more processors through the bus, the memory storing instructions to cause the one or more processors to receive a request from a first user account to access content on the device; and when the content is restricted for the first user account, transmitting, through the network interface, a request for authorization from a second user account to access the restricted content on the device by the first user account, wherein content that is common to the first user account and the second user account is not restricted.

26. The device of claim 25, wherein the first user account has limited authority to access the restricted content and the second user account has full authority to access the restricted content.

27. A device comprising:

one or more processors;

a network interface coupled to the one or more processors through a bus; and a memory coupled to the one or more processors through the bus, the memory storing instructions to cause the one or more processors to receive, through the network interface, a request for authorization to access restricted content on the device by a first user account logged into the device; and determine, through a second user account logged into the device, whether to authorize the access to the restricted content on the device by the first user account, wherein content that is common to the first user account and the second user account is not restricted.

28. The device of claim 27, wherein the first user account has limited authority to access the restricted content and the second user account has full authority to access the restricted content.

* * * * *

UNITED STATES PATENT AND TRADEMARK OFFICE
CERTIFICATE OF CORRECTION

PATENT NO. : 10,142,835 B2  
APPLICATION NO. : 15/134638  
DATED : November 27, 2018  
INVENTOR(S) : Stephen Hayden Cotterill Page 1 of 1

It is certified that error appears in the above-identified patent and that said Letters Patent is hereby corrected as shown below:

On the Title Page

Item (57), Column 2, Line 8, delete "car" and insert -- or --, therefor.

Item (57), Column 2, Line 14, delete "elect" and insert -- select --, therefor.

In the Claims

In Claim 7, at Column 14, Line 26, before "request" insert -- a --.

In Claim 25, at Column 16, Line 22, after "wherein" insert -- the --.

Signed and Sealed this  
Twenty-eighth Day of April, 2020

Andrei Iancu  
*Director of the United States Patent and Trademark Office*